United States Patent
Makashir et al.

(10) Patent No.: US 11,195,522 B1
(45) Date of Patent: Dec. 7, 2021

(54) FALSE INVOCATION REJECTION FOR SPEECH PROCESSING SYSTEMS

(71) Applicant: Amazon Technologies, Inc., Seattle, WA (US)

(72) Inventors: Sumit Makashir, Seattle, WA (US);
Adrien Carre, Brooklyn, NY (US);
Jack FitzGerald, Seattle, WA (US);
Cong Zhang, Seattle, WA (US); Piyush Bhargava, Seattle, WA (US);
Chandrashekar Nagaraju, Redmond, WA (US); Md Moshiur Rahman, Bothell, WA (US); Xin Liang, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 213 days.

(21) Appl. No.: 16/443,345

(22) Filed: Jun. 17, 2019

(51) Int. Cl.

| | |
|---|---|
| G10L 15/00 | (2013.01) |
| G10L 15/18 | (2013.01) |
| G10L 15/22 | (2006.01) |
| G10L 15/02 | (2006.01) |
| G10L 15/30 | (2013.01) |
| G10L 15/06 | (2013.01) |
| G06F 40/30 | (2020.01) |
| G06F 40/295 | (2020.01) |
| G10L 13/00 | (2006.01) |

(52) U.S. Cl.
CPC ........ *G10L 15/1815* (2013.01); *G06F 40/295* (2020.01); *G06F 40/30* (2020.01); *G10L 13/00* (2013.01); *G10L 15/02* (2013.01); *G10L 15/063* (2013.01); *G10L 15/22* (2013.01); *G10L 15/30* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 9,224,387 | B1* | 12/2015 | Slifka | G10L 15/065 |
| 9,721,570 | B1 | 8/2017 | Beal et al. | |
| 9,818,407 | B1* | 11/2017 | Secker-Walker | G10L 15/32 |
| 9,916,826 | B1* | 3/2018 | Slifka | G10L 15/065 |
| 10,515,625 | B1* | 12/2019 | Metallinou | G10L 15/26 |
| 10,522,134 | B1* | 12/2019 | Matsoukas | G10L 15/01 |
| 10,789,959 | B2* | 9/2020 | Kajarekar | G10L 17/24 |
| 2019/0130904 | A1* | 5/2019 | Homma | G10L 15/26 |

* cited by examiner

*Primary Examiner* — Satwant K Singh
(74) *Attorney, Agent, or Firm* — K&L Gates

(57) ABSTRACT

Devices and techniques are generally described for rejecting false invocations of speech processing skills. In various examples, utterance data comprising automatic speech recognition (ASR) data and natural language understanding (NLU) data may be received. In some examples, ASR confidence data indicating a confidence level of the ASR data may be received. In further examples, NLU confidence data indicating a confidence level of the NLU data may be received. A machine learning model may determine, based at least in part on the ASR confidence data and the NLU confidence data, first false invocation data indicating a likelihood of false invocation of a speech processing skill. In some examples, a first directive may be sent to the speech processing system based at least in part on the first false invocation data. The first directive may be effective to cause the speech processing system to end a current dialog session.

20 Claims, 13 Drawing Sheets

FALSE INVOCATION REJECTION FOR SPEECH PROCESSING SYSTEMS

BACKGROUND

Automatic speech recognition (ASR) combined with language processing techniques may enable a computing device to retrieve and process commands from a user based on the user's spoken commands. In some systems, speech recognition and/or voice-controlled devices activate upon detection of a spoken "wakeword". Natural language processing is used to translate the spoken requests into semantic interpretations of the spoken command. Executable instructions are generated based on the semantic interpretation of the spoken command. The executable instructions are executed and a corresponding task is performed. Such speech processing and voice control may be used by personal computers, hand-held devices, telephone computer systems, and a wide variety of other computing devices to improve human-computer interactions and to control various systems.

DETAILED DESCRIPTION

Figure 1A:
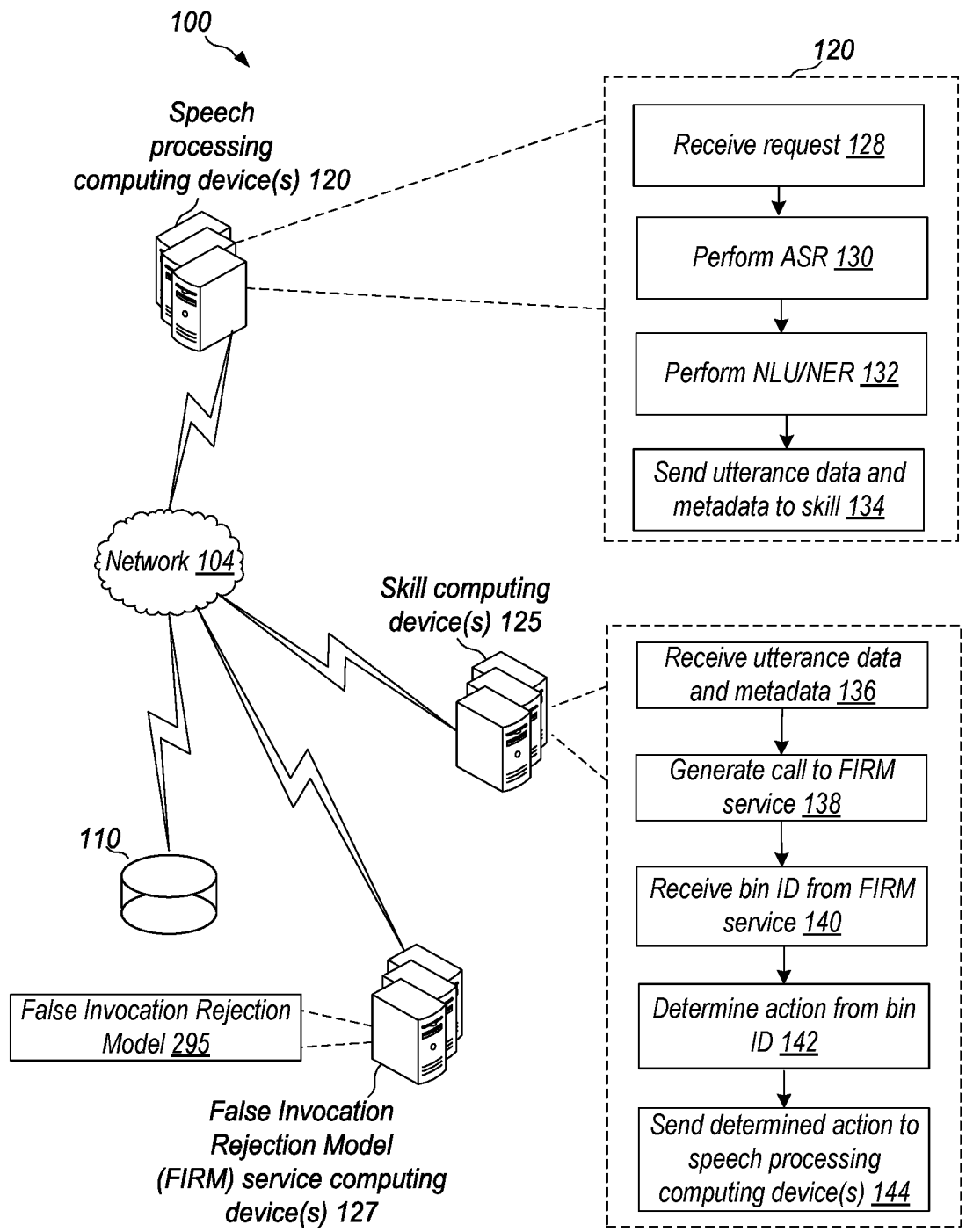
FIGS. 1A-1B are block diagrams of example systems configured to provide false invocation rejection, according to various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language, resulting in specific executable commands or other type of instructions. Text-to-speech (TTS) is a field of computer science, artificial intelligence, and linguistics concerned with enabling computers to output synthesized speech. ASR, NLU, and TTS may be used together as part of a speech processing system.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may include TTS where a machine learning model may receive input audio data (e.g., a user utterance) and may generate output audio data in response to the utterance. In various examples, spoken language processing (speech processing) may generate various speech processing confidence data related to outputs of various components of the speech processing system. For example, NLU confidence data may indicate a confidence level that the intents, slots, and/or entities determined by an NLU system are appropriate for a given utterance. Similarly, ASR confidence data may indicate a confidence level of an ASR text transcription of an utterance. In another example, arbitration confidence data may indicate a confidence level in the selection of a skill by an arbitration component for processing a request included in an utterance. In general, speech processing may be described in terms of processing utterances. The term "utterance," as used herein, may include both spoken natural language inputs and other forms of natural language inputs (e.g., input text).

Speech processing may be used in a variety of contexts, including in speech processing enabled devices (e.g., devices employing voice control and/or speech processing "voice assistants") and/or systems. Examples of speech processing systems and/or voice-enabled personal assistants include the Siri system from Apple Inc. of Cupertino, Calif., voice-enabled actions invoked by the Google Assistant system from Google LLC of Mountain View, Calif., Dragon speech recognition software from Nuance Communications of Burlington, Mass., the Cortana system from Microsoft of Redmond, Wash., the Alexa system from Amazon.com, Inc. of Seattle, Wash., etc.

Speech processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network, or by some combination of the speech processing enabled device and the one or more other computing devices. In various examples, speech processing enabled devices may include and/or may be configured in communication with speakers and/or displays effective to output information obtained in response to a user's spoken request or command, and/or to output content that may be of interest to one or more user's.

Storage and/or use of data related to a particular person or device (e.g., contextual data and/or any personal data) may be controlled by a user using privacy controls associated with a speech processing enabled device and/or a companion application associated with a speech processing enabled device. Accordingly, users may opt out of storage of personal and/or contextual data and/or may select particular types of personal and/or contextual data that may be stored while preventing aggregation and storage of other types of personal and/or contextual data. Additionally, aggregation, storage, and use of personal and/or contextual information, as described herein, may be compliant with privacy controls, even if not legally subject to them. For example, personal, contextual, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the data that may be used to optimize the machine learning techniques described herein may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

A speech-controlled computing system may respond to user utterances by outputting content and/or performing one or more other actions, such as initiating communications (e.g., synchronous phone/video calls and/or asynchronous messaging), playing music, providing information, calling a taxi, displaying an image, controlling other devices, etc. Generally, input data received by the various speech processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech processing systems may be configured with multiple applications (e.g., thousands, tens of thousands, or more applications) that can be used to potentially respond to a user request. Applications may be referred to herein as "skills". Natural language processing systems may be effective to process spoken and/or textual natural language inputs to determine data representing a semantic understanding of the inputs. Skills may include any application effective to receive inputs from a natural language processing system in order to take one or more actions based on those inputs. For example, a speech processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. In at least some examples, a "skill," "skill component," "speech processing skill," and the like may be software running on a computing device, similar to a traditional software application running on a computing device. Such skills may include a voice user interface in addition to or instead of, in at least some instances, a graphical user interface, smart home device interface, and/or other type of interface.

As previously described, in at least some examples, a "skill," "skill component," and the like may be software that is run by a third party to the herein disclosed speech processing system (e.g., a 3P skill developer), without the third party provisioning or managing one or more servers for executing the skill. In such an implementation, the system may be triggered to run a skill in response to the third party calling the system via the Internet or a mobile application. Such implementation may include, but is not limited to, Amazon's AWS Lambda.

In various examples, a speech processing enabled device may include a wakeword detection component. The wakeword detection component may process audio data captured by microphones of the speech processing enabled device and may determine whether or not a keyword (e.g., a wakeword) is detected in the audio data. When a wakeword is detected, the speech processing enabled device may enter a "sending mode" in which audio detected by the microphones following the wakeword (e.g., data representing a user utterance spoken after the wakeword) may be sent to speech processing computing component(s) for further speech processing (e.g., ASR, NLU, etc.). In various examples, the wakeword detection component may be used to distinguish between audio that is intended for the speech processing system and audio that is not intended for the speech processing system.

Described herein are techniques and systems effective to detect and reject false invocation of speech processing skills. False invocation of speech processing skills (and/or of invoked actions executed by the skills) may occur as a result of: (1) a "false wake," in which a wakeword is detected followed by an unintentional routing of a request to a skill, and/or (2) a "false intent," in which an utterance is misinterpreted and/or otherwise incorrectly routed to and acted on by a skill. A false wake type false invocation may occur, for example, when a first person is explaining to a second person how a voice assistant responds to various commands. The person may use the wakeword as an example, which may cause the speech processing enabled device to enter listening mode. Thereafter, audio representing the first person's explanation to the second person may be sent to the speech processing system and may be interpreted as a request to perform some action by a skill. A false intent type false invocation may occur, for example, when the speech processing enabled device correctly determines that the user has spoken the wakeword and therefore intends to issue a command, but a speech processing component misinterprets some part of the utterance causing an unintended action to occur. For example, if a user says "Computer, next," in order to skip a music track, but the ASR component instead determines that the utterance was "Computer, text," the request may be routed to a communication skill that may cause a text message to be sent.

Described herein is a false invocation rejection model that may be trained to classify the likelihood that a given utterance represents a false invocation of a skill. The false invocation rejection model may be deployed downstream of NLU and/or ASR processing. Accordingly, feature data input into the false invocation rejection model may be semantically rich and may include representations of the confidence scores of the NLU and/or ASR output. For example, an arbitration layer downstream of NLU and/or ASR output may determine one or more skills effective to process a given utterance. The arbitration layer may select a skill based at least in part on the NLU and/or ASR output. In various examples, the false invocation rejection model may be instantiated in or downstream from the arbitration layer. Further, in at least some examples, an arbitration component of the arbitration layer may generate a confidence score pertaining to the selection of a skill (e.g., from among other candidate skills) for processing an utterance. The confidence score may represent a confidence that the skill selected by the arbitration layer for processing the utterance is the appropriate skill. In various examples, the confidence score may be used by the false invocation rejection model as feature data that may, in turn, be used to determine whether or not the selected skill has been falsely invoked.

Although the wakeword detection component can filter out utterances not intended for the speech processing system, such filtering may be agnostic of user intent. Conversely, the false invocation rejection model described herein may be configurable based on the semantic intent of the utterance. For example, the false invocation rejection model may be configured more conservatively (e.g., requiring higher confidence in the utterance) when the skill and/or action invoked is of relative importance (e.g., making a purchase, unlocking a door, sending a message). Similarly, the false invocation rejection model may be configured more liberally (e.g., requiring relatively low confidence in the utterance) when the skill and/or action invoked is relatively trivial (e.g., e.g., decreasing volume, skipping a track, playing a game, providing the weather report). As described in further detail below, the false invocation rejection model may output false invocation data comprising a confidence score. The confidence score may indicate a likelihood that the invocation of the relevant speech processing skill (and/or skill action) is (or is not) a false invocation.

In various examples, the scores may be separated into two or more bins. For example, scores indicating a high likelihood that a false invocation has occurred may correspond to a bin that causes the skill to reject the action and the speech processing system to end the current dialog session. In another example, scores indicating a low likelihood that a false invocation has occurred may correspond to a bin that allows the skill to perform the action as usual. In a third example, scores indicating a medium likelihood that a false invocation has occurred (e.g., a bin between the high and low likelihood bins) may cause the TTS component to prompt the user to confirm the request prior to performing the action.

In various other examples, other filtering may be used in addition to the false invocation machine learning models described herein. For example, various speech processing confidence data may be generated by speech processing components of the speech processing system while processing a user utterance. For example, an ASR component may generate a confidence score indicating a confidence in the transcription of each word of an utterance, an NLU component may generate a confidence score for each intent determined for an utterance. An arbitration component may generate a confidence score for each candidate skill, and so on. In various examples, heuristic thresholds specific to one or more types of data may be used to determine whether or not an utterance represents a false invocation of a speech processing skill. For example, the ASR confidence score described above may be associated with a per-word ASR confidence score. If the mean ASR confidence score for an utterance is less than a threshold score of 0.5, for example, the utterance may be rejected as a false invocation. It should be appreciated that the above scenario is merely an example. Any threshold values and data output by the speech processing system may be used in accordance with a desired implementation. Additionally, the system may be configurable such that heuristic thresholds may override the false invocation rejection model (FIRM) service determined thresholds. For example, the FIRM service may determine that an utterance does not represent a false invocation and should therefore be processed, as normal, by the relevant skill. However, a heuristic threshold may be violated (e.g., an NLU intent confidence score may be less than a corresponding heuristic threshold value). The system may be configured such that if the NLU intent confidence score is less than the corresponding heuristic threshold value that the invocation of the skill is a false invocation, regardless of the output of the false invocation rejection model. The above example of the use of heuristic thresholds together with the FIRM service represents one possible implementation. Any desired implementation using one or more of the FIRM service and heuristic thresholds may be used in accordance with the desired implementation.

FIG. 1A is a diagram of an example system 100 configured to provide false invocation rejection for speech processing systems, according to various embodiments of the present disclosure.

As shown in FIG. 1A, the system 100 includes a speech processing enabled device 110. Generally, a speech processing enabled device 110 may be a device that allows a user to interact with a speech processing system using voice commands. In some examples, the speech processing system may be implemented in whole or in part by the speech processing enabled device (e.g., using computing resources of speech processing enabled device 110). However, in some other examples, the speech processing system may be implemented in whole or in part by other speech processing computing device(s) 120 that are configured in communication with speech processing enabled device 110 (e.g., over network 104).

Speech processing enabled device 110 may comprise speakers and audio circuitry effective to output audio. Additionally, speech processing enabled device 110 may comprise one or more microphones effective to capture audio, such as spoken user utterances. In various examples, speech processing enabled device 110 may include a display effective to display images and/or video data. However, in some other examples, speech processing enabled device 110 may not include an integrated display. Speech processing enabled device 110 may include communication hardware effective to allow speech processing enabled device 110 to communicate with one or more other computing devices over a network 104. In various examples, network 104 may represent a local area network (LAN) and/or a wide area network (WAN) such as the internet. Speech processing enabled device 110 may be effective to communicate over network 104 with speech processing computing device(s) 120. As described in further detail below, speech processing computing device(s) 120 may form a speech processing system that may perform various speech processing techniques in order to semantically interpret and/or perform actions in response to user speech detected by speech processing enabled device 110.

For example, a user of speech processing enabled device 110 may utter the audible request: "Computer, what is the current weather in Seattle, Wash.?" One or more microphones of speech processing enabled device 110 may generate electrical signals corresponding to the spoken request. In the example, the word "Computer" may be a wakeword that may be detected by a wakeword detection component of speech processing enabled device 110. The wakeword detection component may determine that the user has spoken the wakeword "computer." Accordingly, the speech processing enabled device 110 may encode and send audio data corresponding to the portion of the utterance following the wakeword over network 104 to speech processing computing device(s) 120. At action 128, speech processing computing device(s) 120 may receive the request comprising the audio data representing the user utterance.

As described in further detail below, automatic speech recognition (ASR) may be performed on the audio data at action 130 to generate text data representing the utterance. In at least some examples, metadata may be generated by the ASR component during the determination of the text data from the audio data. Metadata may include confidence scores representing a confidence level that the ASR component has accurately represented the audio as text data. In another example, metadata may include a confidence level in the ASR transcription of each token (e.g., word) of the utterance. Other metadata may include utterance duration data, stream duration data, the number of tokens output by ASR, device type (e.g., the device type of speech processing enabled device 110), device volume (volume of playback on speech processing enabled device 110), etc. ASR data and metadata generated during ASR processing may be sent to skill computing device(s) 125 at action 134.

In addition, the text data generated by the ASR component may be sent to a natural language understanding component. At action 132 NLU processing and/or named entity recognition (NER) may be performed on the text data. NLU may be used to generate one or more semantic interpretations of the text data. As described in further detail below, the NLU may determine one or more slots and/or intents that may correspond to one or more actions that may be taken in response to the spoken command. In various examples, the results of the NLU processing and/or NER processing may be sent to a skill computing device(s) 125 as utterance data. In addition, metadata related to NLU processing and/or NER processing may be sent to the skill computing device(s) 125 at action 134. Metadata may include one or more confidence scores may be generated by the NLU component, NLU classification type (deterministic vs. statistical), NLU slot data (e.g., data indicating the presence of a given slot, with separate data for each slot). The confidence scores may represent a confidence level for the top NLU hypothesis (e.g., the top intent determined by the NLU component) and/or for one or more other intents determined by the NLU component for the text data. Additionally, metadata may be generated by the NER component and sent to the skill computing device(s) 125. Metadata generated by the NER component may relate to confidences in the hypotheses determined by the NER component, entity recognition match data (e.g., indicating a type of match, such as "exact match," "prefix match," etc.). Although in some examples NLU processing may include NER processing, in other examples NLU and NER processing may be performed by separate components of a spoken language processing system.

At action 136, skill computing device(s) 125 may receive the utterance data and the metadata from speech processing computing device(s) 120. As described in further detail below, a skill executing on skill computing device(s) 125 may be effective to determine an action implicated by the utterance based on the NLU data (e.g., the specification of intents and/or slots), the ASR data (e.g., the text transcription of the utterance), the NER data (e.g., specification of a particular entity associated with indexed gazetteer data for the skill), the utterance audio data, and/or the metadata described above.

In the example depicted in FIG. 1A, prior to executing the determined action, the skill may send a request to FIRM service computing device 127 implementing a FIRM service 295. In various examples, the skill may include a library including a FIRM client for the FIRM service 295 executing on the FIRM service computing device 127. The skill may generate a call to the FIRM service 295 at action 138. Calling the FIRM service may include sending the utterance data (e.g., the audio data, the ASR transcription data, and/or the NLU data (e.g., slot and/or intent data) to the FIRM service computing device(s) 127 along with the metadata associated with the utterance (described above)). In various examples, the utterance data and associated metadata may be described as an utterance object. Accordingly, the skill may send the utterance object to the FIRM service 295 along with the request to invoke the FIRM service 295.

The FIRM model may be a machine learning model loaded by FIRM service computing device 127. The FIRM model may extract feature data from the utterance object and may determine a number of feature vectors representing the utterance data and the associated metadata. For example, a first feature vector may represent ASR token confidence— the word confidence for each word determined in the utterance by the ASR component. A second feature vector may represent the NLU confidence for the top hypothesis (e.g., the top-ranked intent determined probabilistically by the NLU component). A third feature vector may represent an arbitration confidence data indicating a confidence that a particular skill is the appropriate skill for processing a request found in an utterance. Various other features are described in further detail below. Any number of different features may be used in accordance with various embodiments described herein. The FIRM service 295 may comprise a machine learning model trained using various features to generate false invocation data. The false invocation data may comprise a confidence score indicating a likelihood that the utterance represents a false invocation of the relevant skill action and/or of the invoked skill. Conversely, the FIRM model may be a machine learning model trained to generate false invocation data comprising a confidence score indicating a likelihood that the utterance does not represent a false invocation of the relevant skill action. Generally, in the examples provided herein, the false invocation data output by the FIRM service 295 may be used to indicate a confidence that the utterance represents a false invocation of the relevant skill action. However, examples where the confidence score indicates that the utterance does not represent a false invocation are also explicitly contemplated.

Generally, in machine learned models, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result may determine the activation of a neuron in a subsequent layer. In addition, a bias value may be used to shift the output of the activation function to the left or right on the x-axis and thus may bias a neuron toward inactivation.

Generally, in machine learning models, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent algorithm (or gradient ascent algorithm) to incrementally adjust the weights to cause the most rapid decrease (or increase) to the output of the loss function. The method of updating the parameters of the machine learning model may be referred to as back propagation.

In various examples, the machine learning models of the FIRM service may be trained using training data comprising a set of utterance features that have been annotated with data indicating whether or not the utterance represents a false invocation of the relevant skill and/or skill action.

In various examples, the confidence scores output by the FIRM service 295 may be separated into confidence score bins. In various examples, the threshold confidence score values separating the bins may be configurable and may be different depending on the particular domain of the skill, the relevant action determined by the skill, and/or based on the skill itself.

In an example, the confidence scores output by the FIRM service 295 may be separated into 3 confidence score bins—a high bin, a mid bin, and a low bin. The high bin and the mid bin may be separated by a first confidence score threshold value, and the mid bin and the low bin may be separated by a second confidence score threshold value (lower than the first confidence score threshold value). In the example, confidence score output by the FIRM service 295 that falls into the high bin may result in the utterance being rejected (as the high confidence indicates a high likelihood that the utterance represents a false invocation of the relevant skill action). A confidence score output of the FIRM service 295 that falls into the low bin may result in the utterance being allowed without confirmation. Accordingly, the skill may perform the relevant skill action without prompting the user for confirmation that the action was intended by the user. The mid bin may indicate medium confidence in a false invocation. Accordingly, a confidence score output of the FIRM model falling into the mid bin may prompt the skill to request user confirmation prior to performing the action. Although three bins are described above for brevity and clarity, any number of bins may be used in accordance with the present disclosure. Additionally, different operations may be associated with each bin. For example, a particular bin may be associated with a re-ranking of intent hypotheses and/or selection of relevant skills. In various examples, confidence scores output by the FIRM service 295 may be said to "satisfy" a threshold value if the confidence score is greater than or equal to the threshold value, while in other example implementations, confidence scores output by the FIRM service 295 may "satisfy" the threshold value if the confidence score is less than or equal to the threshold value. In various examples, confidence scores that do not satisfy a particular threshold may be said to "violate" the particular threshold. For example, in an example configuration, a skill 290 may be effective to take action A if a particular threshold is satisfied and action B if the threshold is violated. In the example, confidence scores that are above the threshold may satisfy the threshold while confidence scores that are less than or equal to the threshold may violate the threshold (although the opposite implementation is also feasible). The confidence score output by FIRM service 295 may be above the threshold value. Accordingly, the threshold may be satisfied and the skill 290 may perform action A.

At action 140, the skill may receive the bin identifier (e.g., bin ID) from the FIRM service. At action 142 the skill may determine the appropriate action to take in response to the bin identifier. For example, as described above, the skill may determine that the relevant skill action should not be taken and that the dialog session should be ended based on the bin ID indicating a bin associated with high confidence in a false invocation. In another example, if the bin ID received at action 140 indicates a low likelihood that a false invocation has occurred, the skill may execute the relevant skill action. Accordingly, the bin ID may be false invocation indicator data indicating the likelihood that an invocation of the skill (and/or a particular skill action) is a false invocation. The false invocation indicator data (e.g., the bin ID) may be effective to cause the relevant skill to perform one or more actions associated with the particular bin ID. For example, receiving a bin ID from the FIRM service computing device(s) 127 may cause the skill to reject the invocation of the skill (and/or an action of the skill). In another example, receiving a bin ID from the FIRM service computing device(s) 127 may cause the skill to process the utterance and perform the relevant skill action. In another example, receiving a bin ID from the FIRM service computing device(s) 127 may cause the skill to generate text data that may be sent to a TTS component of the speech processing computing device(s) 120 to generate audio data that may be used to prompt the user to confirm the invoked action of the skill.

At action 144, the skill may send the determined action to speech processing computing device(s) 120 as a directive. For example, if a determination has been made that the utterance represents a false invocation (e.g., based on the bin received from the FIRM model), the skill may send an "end session" directive to speech processing computing device(s) 120 indicating that the current dialog session should be ended. In various examples, a directive may be a signal sent from a skill (e.g., from skill computing device(s) 125) to speech processing computing device(s) 120 effective to instruct the speech processing computing device(s) 125 to take an action specified by the directive (e.g., by a data payload included in the directive). In turn, the speech processing computing device(s) 120 may send a signal to speech processing enabled device 110 instructing the speech processing enabled device 110 to cease transmitting audio to speech processing computing device(s) 120 and to enter a standby mode (wherein the speech processing enabled device 110 listens for the wakeword before transmitting any audio data to speech processing computing device(s) 120). In at least some examples, the "end session" signal may also be effective to turn off an indicator light on speech processing enabled device 110. In various examples, the indicator light may indicate that the speech processing enabled device 110 is recording and transmitting audio to the speech processing system of speech processing computing device(s) 120.

In another example, if a determination has been made that the utterance does not represent a false invocation (e.g., based on the bin received from the FIRM model), the skill may generate an instruction and/or a directive that may be effective, when executed by speech processing enabled device 110, to cause speech processing enabled device 110 to perform the relevant skill action corresponding to the utterance. For example, if the utterance was "Computer, show me the weather in Seattle," the skill computing device(s) 125 may generate instructions effective to cause speech processing enabled device 110 to retrieve and display an image (or output audio) describing the current weather for Seattle, Wash. The instructions may be sent to, and executed by, speech processing enabled device 110 in order to output the requested content by speech processing enabled device 110. In some further examples, the action may invoke a TTS module of speech processing computing device(s) 120 by sending text data to the TTS module. The TTS module may, in turn, transform the text data into audio data that may be sent to, and output by, speech processing enabled device 110.

Figure 1B:
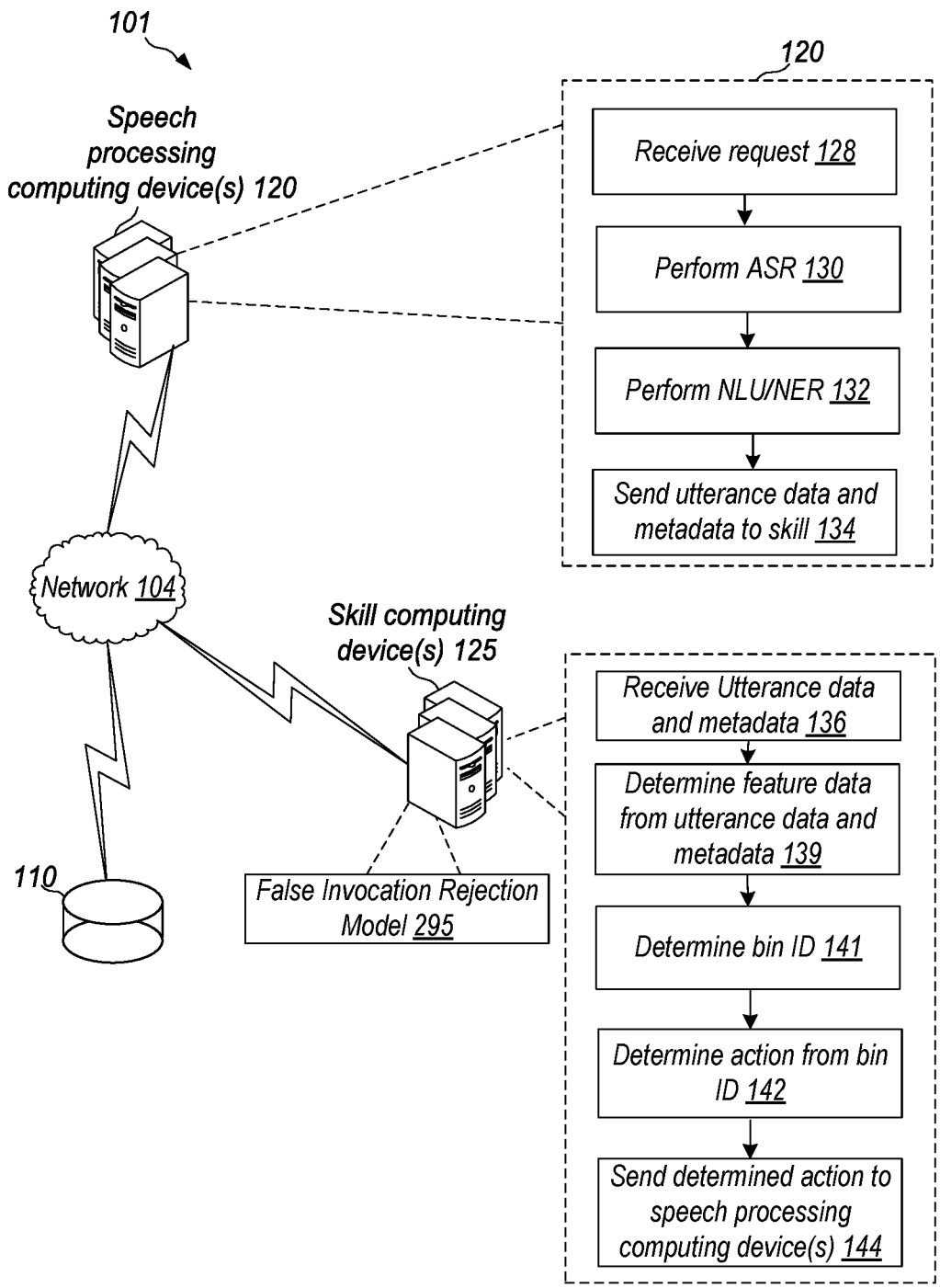

FIG. 1B is a diagram of another example system 101 configured to provide false invocation rejection for speech processing systems, according to various embodiments of the present disclosure. System 101 may be similar in many respects to system 100 depicted in FIG. 1A. However, in system 101, the skill computing device(s) 125 and/or a skill executing thereon may implement the FIRM service 295.

Accordingly, at action 139, the FIRM service 295 loaded into memory by skill computing device(s) 125 may determine feature data representing the utterance data and metadata received at action 136. The feature data may be used as an input to the FIRM service 295 (and/or machine learning models thereof). The FIRM service 295 may output a confidence score. At action 141 the skill computing device(s) 125 may determine the bin that is associated with the confidence score.

At action 142 the skill may determine the appropriate action to take in response to the bin identifier. For example, as described above, the skill may determine that the relevant skill action should not be taken and that the dialog session should be ended based on the bin ID indicating a bin associated with high confidence in a false invocation. In another example, if the bin ID received at action 140 indicates a low likelihood that a false invocation has occurred, the skill may execute the relevant skill action.

At action 144, the skill may send the determined action to speech processing computing device(s) 120 (e.g., as a directive). For example, if a determination has been made that the utterance represents a false invocation (e.g., based on the bin received from the FIRM service 295), the skill may send an "end session" signal to speech processing computing device(s) 120 indicating that the current dialog session should be ended. In turn, the speech processing computing device(s) 120 may send a directive (e.g., a signal including payload data with computer-executable instructions) to speech processing enabled device 110 instructing the speech processing enabled device 110 to cease transmitting audio to speech processing computing device(s) 120 and to enter a standby mode (wherein the speech processing enabled device 110 listens for the wakeword before transmitting any audio data to speech processing computing device(s) 120). In at least some examples, the "end session" directive may also be effective to turn off an indicator light on speech processing enabled device 110. In various examples, the indicator light may indicate that the speech processing enabled device 110 is recording and transmitting audio to the speech processing system of speech processing computing device(s) 120.

In another example, if a determination has been made that the utterance does not represent a false invocation (e.g., based on the bin received from the FIRM model), the skill may generate an instruction that may be effective, when executed by speech processing enabled device 110, to cause speech processing enabled device 110 to perform the relevant skill action corresponding to the utterance. For example, if the utterance was "Computer, show me the weather in Seattle," the skill computing device(s) 125 may generate instructions effective to cause speech processing enabled device 110 to retrieve and display an image (or audio) describing the current weather for Seattle, Wash. The instructions may be sent to, and executed by, speech processing enabled device 110 in order to output the requested content by speech processing enabled device 110. In some further examples, the action may invoke a TTS module of speech processing computing device(s) 120 by sending text data to the TTS module. The TTS module may, in turn, transform the text data into audio data that may be sent to, and output by, speech processing enabled device 110.

Figure 2A:
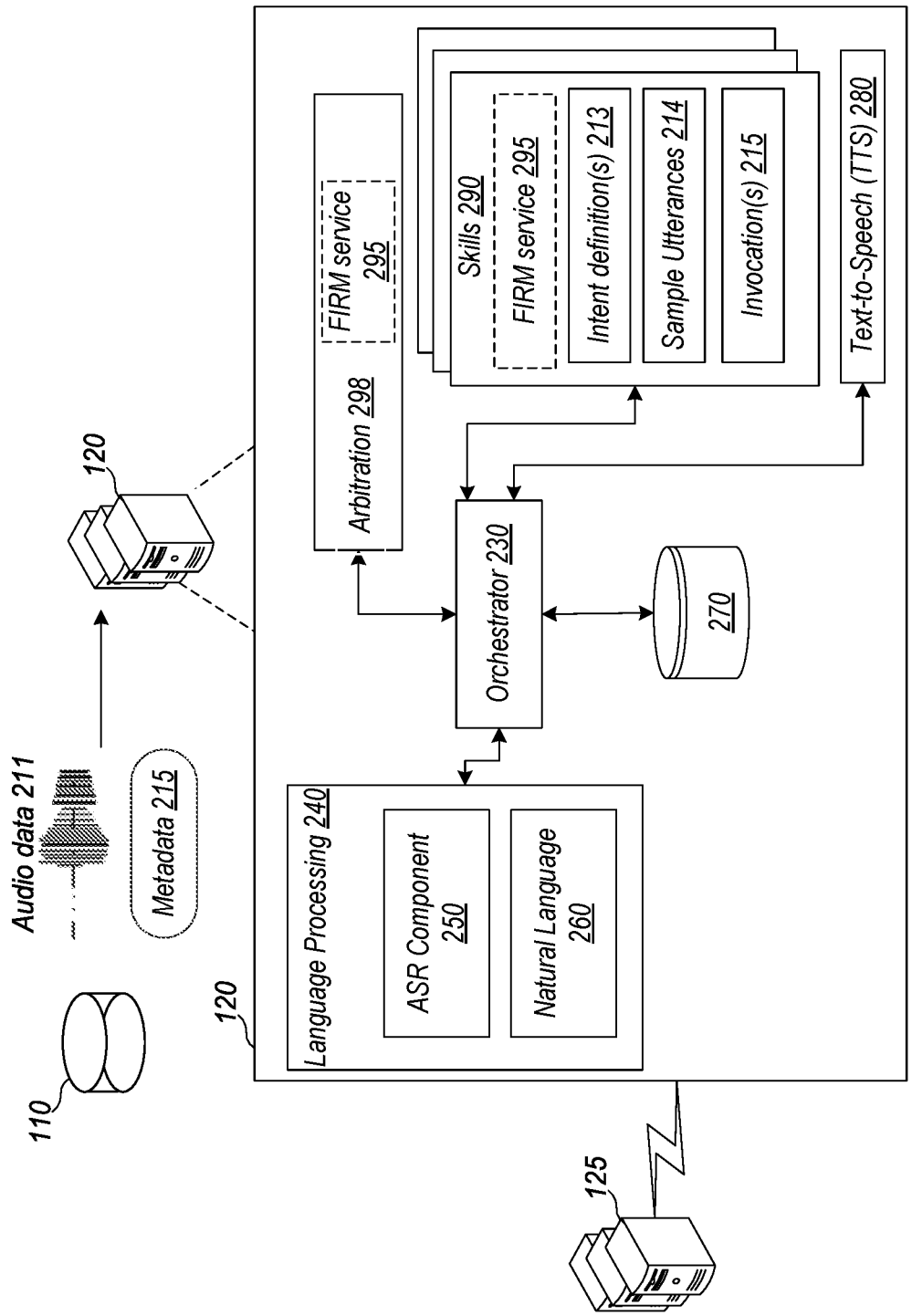
FIGS. 2A-2B are conceptual block diagrams of components of a speech processing system, according to various embodiments of the present disclosure.
Figure 5A:
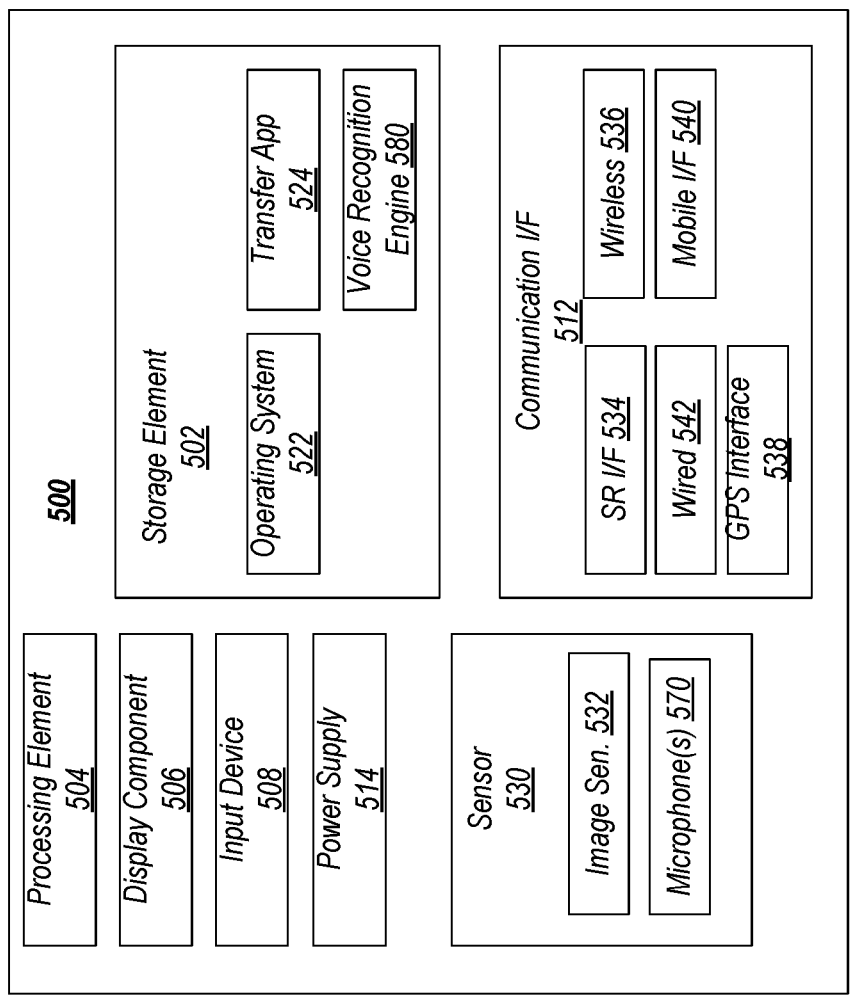
FIGS. 5A-5B are block diagrams showing example architectures of computing devices that may be used in accordance with various embodiments described herein.

A system according to the present disclosure may operate using various components as described in FIG. 2A. The various components illustrated FIG. 2A may be located on the same or different physical devices. Communication between various components illustrated in FIG. 2A may occur directly or across a network(s) 104. The speech processing enabled device 110 may capture audio using an audio capture component, such as the microphone(s) 570 (FIG. 5A). The speech processing enabled device 110 may send audio data 211 (e.g., corresponding to an utterance—whether or not a false invocation) to the speech processing computing device(s) 120. As previously described, the speech processing enabled device 110 may include a wakeword detection component that detects when input audio includes a wakeword. In some instances, the speech processing enabled device 110 may be configured to send audio data to the speech processing computing device(s) 120 when the speech processing enabled device 110 detects a wakeword. The speech processing enabled device 110 may also send metadata 215 (e.g., including device identifiers, device type data, contextual data, IP address data, room location data, etc.) to the speech processing computing device(s) 120. The components depicted in FIG. 2A, including components of speech processing computing device(s) 120 may be generally referred to as spoken language processing components, a spoken language processing system, speech processing components, and/or a speech processing system. Additionally, in various examples, the components depicted in FIG. 2A may process written input (e.g., text data) in addition to spoken input.

Upon receipt by the speech processing computing device(s) 120, the audio data 211 may be sent to an orchestrator 230. The orchestrator 230 may include memory and logic that enables the orchestrator 230 to initiate a dialog session and to transmit various pieces and forms of data to various components of the system.

The orchestrator 230 may send the audio data 211 to a language processing component 240. An ASR component 250 (e.g., a speech recognition component) of the language processing component 240 transcribes the audio data 211 into one or more hypotheses representing speech contained in the audio data 211. The ASR component 250 interprets the speech in the audio data based on a similarity between the characteristics of the audio data corresponding to the speech and pre-established language models. For example, the ASR component 250 may compare the audio data 211 with models for sounds (e.g., subword units such as phonemes) and sequences of sounds to identify words that match the sequence of sounds in the speech represented in the audio data 211. The ASR component 250 may send text data generated thereby to a natural language component 260 of the language processing component 240. The text data output by the ASR component 250 may include a top scoring hypothesis of the speech represented in the audio data 211 or may include an N-best list including a group of hypotheses of the speech represented in the audio data 211, and potentially respective scores ASR processing confidence scores. As previously described, in some other examples, the ASR component 250 (and/or other components of the speech processing computing device(s) 120) may generate other metadata associated with the utterance such as an overall utterance confidence score, per-word (e.g., per token) confidence scores for the utterance, utterance duration, stream duration (e.g., duration of the stream of audio data from speech processing enabled device 110 to speech processing computing device(s) 120), a number of tokens output by ASR, etc.

The natural language component 260 attempts to make a semantic interpretation of the phrases or statements represented in the text data input therein. That is, the natural language component 260 determines one or more meanings associated with the phrases or statements represented in the text data based on individual words represented in the text data. The natural language component 260 interprets a text string to derive an intent of the user (e.g., an action that the user desires be performed) as well as pertinent pieces of information in the text data that allow a device (e.g., the speech processing enabled device 110, the speech processing computing device(s) 120, the skill computing device(s) 125, etc.) to complete the intent. For example, if the text data corresponds to "Set temperature to 74 degrees," the natural language component 260 may determine the user intended to invoke a climate intent with a target temperature value slot of 74 degrees Fahrenheit. As previously described, in addition to the NLU intent and slot data, the natural language component 260 may generate other metadata associated with the utterance (e.g., with the audio data 211). Examples of such metadata include, an NLU confidence score for the top intent hypothesis, NLU classification type (e.g., statistical vs. deterministic), NLU slot presence (e.g., data indicating that a particular slot was present), NLU confidence score for the overall top hypothesis (e.g., including the relevant skill, intent, and/or slot), entity recognition confidence scores, entity recognition match types (e.g., exact match, prefix match, suffix match, etc.), etc.

In some examples, the FIRM service 295 may be implemented as a part of, or in communication with, arbitration component 298. As previously described, in various other examples, the FIRM service 295 may be implemented by skill computing device(s) 125 (and/or by one or more skills 290 executing thereon), and/or by a separate computing system (e.g., FIRM service computing device(s) 127). The FIRM service 295 may determine feature data used as input in an input layer of the FIRM model and may extract such feature data from the utterance data and metadata generated by ASR component 250, natural language component 260 (including named entity recognition components), by the speech processing enabled device 110, etc.

As previously described, the speech processing computing device(s) 120 may include one or more skills 290 configured to perform the various techniques herein disclosed, as well as other, processes. The speech processing computing device(s) 120 may also be in communication with one or more skill computing device(s) 125 that execute one or more skills (e.g., skills 290) configured to perform the herein disclosed, as well as other, processes. Arbitration component 298 may receive NLU data (including, for example, NER data) and/or ASR data and may determine one or more candidate skills 290 effective to process the utterance. In various examples, arbitration component 298 may include one or more machine learning classifiers effective to determine a confidence score for each candidate skill. The confidence score may indicate a likelihood that the candidate skill is appropriate to process the utterance. In various examples, the confidence scores generated by arbitration component 298 may be used by FIRM service 295 to determine the likelihood of a false invocation for the particular skill. A skill 290 may comprise intent definition(s) 213, sample utterances 214, and/or invocation data 215. Intent definition(s) 213 may represent actions that a user may perform using the skill. Accordingly, intents defined by intent definition(s) 213 may represent the core functionality of the particular skill 290. Sample utterances 214 may specify words and phrases that users may say to invoke the intents defined by intent definition(s) 213. For example, sample utterances 214 may include slot data effective to identify particular intents of the skill defined by intent definition(s) 213. Invocation data 215 may include slot data effective to identify and invoke the skill. For example, invocation data 215 may include a name of the skill so that the user may invoke the skill by speaking the name and/or requesting that the skill name perform some action defined by intent definition(s) 213. In the example depicted in FIG. 2A, skills 290 may include FIRM service 295.

To enable a skill 290 to execute after selection of the skill 290 by the arbitration component 298, orchestrator 230 may send output from the Natural language component 260 (e.g., text data including tags attributing meaning to the words and phrases represented in the text data), and optionally output from the FIRM service 295 and/or data from the memory 270, to the skill 290.

As previously described, in various examples, the FIRM service 295 may determine a confidence score for the utterance after the relevant skill 290 has determined an action related to the utterance. In some other examples, the FIRM service 295 may determine a confidence score for the utterance after a skill 290 has been selected for processing the utterance by arbitration component 298. As depicted in FIG. 2A, the skill 290 may include the FIRM service 295 and may employ FIRM service 295 to determine whether or not the particular skill 290 and/or a particular action of the skill 290 has been falsely invoked. In other examples, arbitration component 298 may select the skill 290 for processing the utterance based at least in part on the output of the FIRM service 295.

In some examples, the relevant skill 290 may execute the FIRM service 295. As previously discussed in reference to FIGS. 1A and 1B, the FIRM service 295 may output a confidence score and/or an indication of a confidence score bin that may be used to determine whether or not the utterance represents a false invocation of the action of skill. If a confidence score bin indicated by FIRM service 295 indicates that the utterance represents a false invocation, the skill 290 may send an end session message to orchestrator 230 that may cause orchestrator to end the dialog session with speech processing enabled device 110. Conversely, if the confidence score bin indicated by FIRM service 295 indicates that the utterance is not a false invocation, the skill 290 may execute the action as normal. In at least some further examples, the confidence score bin indicated by FIRM service 295 may indicate that the user should be prompted to confirm the action prior to executing the action. Accordingly, skill 290 may send a directive comprising text data corresponding to the user confirmation prompt to orchestrator 230. The orchestrator 230 may send the text data to TTS component 280. TTS component 280 may transform the text data into corresponding audio data. The audio data may be sent by orchestrator 230 over network 104 to speech processing enabled device 110 for output as audio prompting the user to confirm the requested action. If the user confirms the requested action the skill 290 may execute the requested action.

The speech processing computing device(s) 120 may include a non-transitory computer-readable memory 270. The memory 270 may be effective to store the FIRM model for processing utterances post NLU and ASR processing, as described herein. Additionally, the memory 270 may store instructions that may be used to train and/or retrain the FIRM model.

The TTS component 280 may be effective to synthesize speech (e.g., generate audio data) corresponding to text data input therein. The TTS component 280 may perform speech synthesis using one or more different methods. In one method of synthesis called unit selection, the TTS component 280 matches text data against one or more databases of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder. In various examples, the TTS component 280 may output messages requesting that a user confirm an action based at least in part on the FIRM service 295 determining that the utterance may be a false invocation of the action. For example, if the FIRM service 295 indicates that a particular utterance is associated with a confidence score bin 299 that requires that a user be prompted prior to performing an action by a skill 290, the skill 290 may send a directive comprising text data to TTS component 280 (e.g., through orchestrator 230). The TTS component 280 may send audio data corresponding to the text data to speech processing enabled device 110. Speech processing enabled device 110 may be effective to output the audio data as audio. The audio may be a prompt confirming that the action determined by the skill 290 and the speech processing system 120 corresponds to the action that the user intended to invoke.

The various components (230/240/250/260/280/290/295) described above may exist in software, hardware, firmware, or some combination thereof.

The skill computing device(s) 125 and/or the speech processing computing device(s) 120 may reside in a cloud computing environment, a localized computing environment, or some combination thereof. For example, the speech processing enabled device 110 may include computing equipment, some portion of which is configured with all/some of the components/functionality of speech processing computing device(s) 120. The speech processing enabled device 110 may then perform a variety of functions on its own (such as when remote communications are unavailable), and/or may communicate (when capable) with remote based speech processing computing device(s) 120 to perform other functions. Alternatively, all of the functionality may reside on the speech processing enabled device 110 or remotely.

Figure 2B:
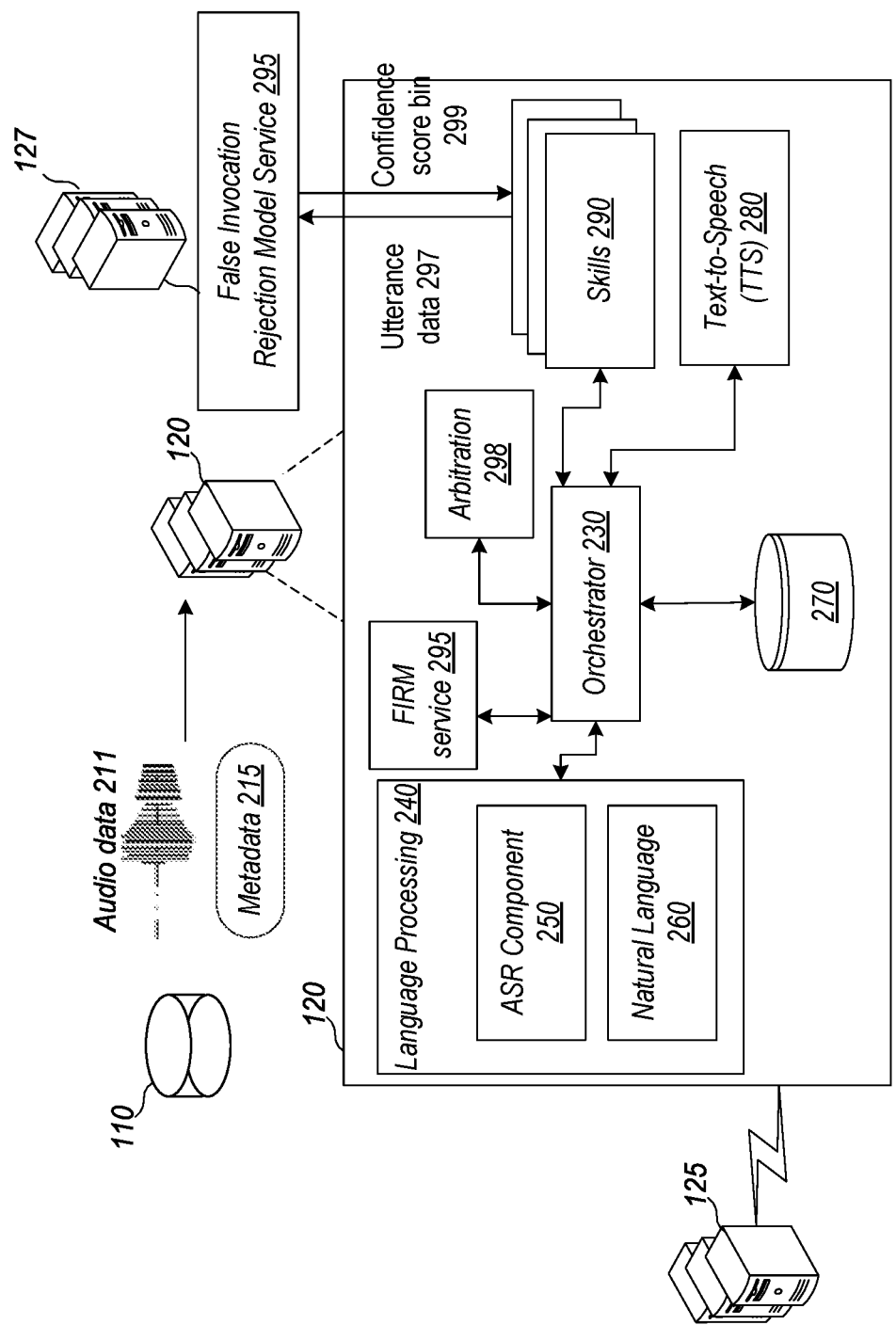

A system according to the present disclosure may operate using various components as described in FIG. 2B. FIG. 2B depicts a system wherein the FIRM service 295 is implemented by a separate FIRM service computing device(s) 127 and/or by speech processing computing device(s) 120. The various components illustrated FIG. 2B may be located on the same or different physical devices. Communication between various components illustrated in FIG. 2B may occur directly or across a network(s) 104. The speech processing enabled device 110 may capture audio using an audio capture component, such as the microphone(s) 570 (FIG. 5A). The speech processing enabled device 110 may send audio data 211 (e.g., corresponding to an utterance— whether or not a false invocation) to the speech processing computing device(s) 120. As previously described, the speech processing enabled device 110 may include a wakeword detection component that detects when input audio includes a wakeword. In some instances, the speech processing enabled device 110 may be configured to send audio data to the speech processing computing device(s) 120 when the speech processing enabled device 110 detects a wakeword. The speech processing enabled device 110 may also send metadata 215 (e.g., including device identifiers, device type data, contextual data, IP address data, room location data, etc.) to the speech processing computing device(s) 120. The components depicted in FIG. 2B, including components of speech processing computing device(s) 120 may be generally referred to as spoken language processing components, a spoken language processing system, speech processing components, and/or a speech processing system. Additionally, in various examples, the components depicted in FIG. 2B may process written input (e.g., text data) in addition to spoken input.

Upon receipt by the speech processing computing device(s) 120, the audio data 211 may be sent to an orchestrator 230. The orchestrator 230 may include memory and logic that enables the orchestrator 230 to initiate a dialog session and to transmit various pieces and forms of data to various components of the system.

The orchestrator 230 may send the audio data 211 to a language processing component 240. An ASR component 250 (e.g., a speech recognition component) of the language processing component 240 transcribes the audio data 211 into one or more hypotheses representing speech contained in the audio data 211. The ASR component 250 interprets the speech in the audio data based on a similarity between the characteristics of the audio data corresponding to the speech and pre-established language models. For example, the ASR component 250 may compare the audio data 211 with models for sounds (e.g., subword units such as phonemes) and sequences of sounds to identify words that match the sequence of sounds in the speech represented in the audio data 211. The ASR component 250 may send text data generated thereby to a natural language component 260 of the language processing component 240. The text data output by the ASR component 250 may include a top scoring hypothesis of the speech represented in the audio data 211 or may include an N-best list including a group of hypotheses of the speech represented in the audio data 211, and potentially respective scores ASR processing confidence scores. As previously described, in some other examples, the ASR component 250 (and/or other components of the speech processing computing device(s) 120) may generate other metadata associated with the utterance such as an overall utterance confidence score, per-word (e.g., per token) confidence scores for the utterance, utterance duration, stream duration (e.g., duration of the stream of audio data from speech processing enabled device 110 to speech processing computing device(s) 120), a number of tokens output by ASR, etc.

The natural language component 260 attempts to make a semantic interpretation of the phrases or statements represented in the text data input therein. That is, the natural language component 260 determines one or more meanings associated with the phrases or statements represented in the text data based on individual words represented in the text data. The natural language component 260 interprets a text string to derive an intent of the user (e.g., an action that the user desires be performed) as well as pertinent pieces of information in the text data that allow a device (e.g., the speech processing enabled device 110, the speech processing computing device(s) 120, the skill computing device(s) 125, etc.) to complete the intent. For example, if the text data corresponds to "Set temperature to 74 degrees," the natural language component 260 may determine the user intended to invoke a climate intent with a target temperature value slot of 74 degrees Fahrenheit. As previously described, in addition to the NLU intent and slot data, the natural language component 260 may generate other metadata associated with the utterance (e.g., with the audio data 211). Examples of such metadata include, an NLU confidence score for the top intent hypothesis, NLU classification type (e.g., statistical vs. deterministic), NLU slot presence (e.g., data indicating that a particular slot was present), NLU confidence score for the overall top hypothesis (e.g., including the relevant skill, intent, and/or slot), entity recognition confidence scores, entity recognition match types (e.g., exact match, prefix match, suffix match, etc.), etc.

In some examples, the speech processing computing device(s) 120 may include the FIRM service 295. For example, FIRM service 295 may be implemented as a part of, or in communication with, arbitration component 298, and/or as a separate component of speech processing computing device(s) 120. As previously described, in various other examples, the FIRM service 295 may be implemented by skill computing device(s) 125 (and/or by one or more skills executing thereon), and/or by a separate computing system (e.g., FIRM service computing device(s) 127). The FIRM service 295 may determine feature data used as input in an input layer of the FIRM model and may extract such feature data from the utterance data and metadata generated by ASR component 250, natural language component 260 (including named entity recognition components), by the speech processing enabled device 110, etc. In various examples, utterance data 297 (including metadata related to the utterance) may be sent from skill 290 to FIRM service 295.

As previously described, in various examples, the FIRM service 295 may determine a confidence score for the utterance after the relevant skill 290 has determined an action related to the utterance. In some other examples, the FIRM service 295 may determine a confidence score for the utterance after a skill 290 has been selected for processing the utterance by arbitration component 298. In fact, the skill 290 may call the FIRM service 295 and may send the utterance data and associated metadata (e.g. utterance data 297) to the FIRM service 295 after determining the relevant skill action. In other examples, arbitration component 298 may select the skill 290 for processing the utterance based at least in part on the output of the FIRM service 295.

In some examples, the relevant skill 290 may execute the FIRM service 295. As previously discussed in reference to FIGS. 1A and 1B, the FIRM service 295 may output a confidence score and/or an indication of a confidence score bin 299 that may be used to determine whether or not the utterance represents a false invocation of the action of skill. If a confidence score bin 299 indicated by FIRM service 295 indicates that the utterance represents a false invocation, the skill 290 may send an end session message to orchestrator 230 that may cause orchestrator to end the dialog session with speech processing enabled device 110. Conversely, if the confidence score bin indicated by FIRM service 295 indicates that the utterance is not a false invocation, the skill 290 may execute the action as normal. In at least some further examples, the confidence score bin indicated by FIRM service 295 may indicate that the user should be prompted to confirm the action prior to executing the action. Accordingly, skill 290 may send text data corresponding to the user confirmation prompt to orchestrator 230. The orchestrator 230 may send the text data to TTS component 280. TTS component 280 may transform the text data into corresponding audio data. The audio data may be sent by orchestrator 230 over network 104 to speech processing enabled device 110 for output as audio prompting the user to confirm the requested action. If the user confirms the requested action the skill 290 may execute the requested action.

The speech processing computing device(s) 120 may include a non-transitory computer-readable memory 270. The memory 270 may be effective to store the FIRM model for processing utterances post NLU and ASR processing, as described herein. Additionally, the memory 270 may store instructions that may be used to train and/or retrain the FIRM model.

As previously described, the speech processing computing device(s) 120 may include one or more skills 290 configured to perform the various techniques herein disclosed, as well as other, processes. The speech processing computing device(s) 120 may also be in communication with one or more skill computing device(s) 125 that execute one or more skills (e.g., skills 290) configured to perform the herein disclosed, as well as other, processes. Arbitration component 298 may receive NLU data (including, for example, NER data) and/or ASR data and may determine one or more candidate skills 290 effective to process the utterance. In various examples, arbitration component 298 may include one or more machine learning classifiers effective to determine a confidence score for each candidate skill. The confidence score may indicate a likelihood that the candidate skill is appropriate to process the utterance. In various examples, the confidence scores generated by arbitration component 298 may be used by FIRM service 295 to determine the likelihood of a false invocation for the particular skill.

To enable a skill 290 to execute after selection of the skill 290 by the arbitration component 298, orchestrator 230 may send output from the Natural language component 260 (e.g., text data including tags attributing meaning to the words and phrases represented in the text data), and optionally output from the FIRM service 295 and/or data from the memory 270, to the skill 290.

The TTS component 280 may be effective to synthesize speech (e.g., generate audio data) corresponding to text data input therein. The TTS component 280 may perform speech synthesis using one or more different methods. In one method of synthesis called unit selection, the TTS component 280 matches text data against one or more databases of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder. In various examples, the TTS component 280 may output messages requesting that a user confirm an action based at least in part on the FIRM service 295 determining that the utterance may be a false invocation of the action. For example, if the FIRM service 295 indicates that a particular utterance is associated with a confidence score bin 299 that requires that a user be prompted prior to performing an action by a skill 290, the skill 290 may send text data to TTS component 280 (e.g., through orchestrator 230). The TTS component 280 may send audio data corresponding to the text data to speech processing enabled device 110. Speech processing enabled device 110 may be effective to output the audio data as audio. The audio may be a prompt confirming that the action determined by the skill 290 and the speech processing system 120 corresponds to the action that the user intended to invoke.

The various components (230/240/250/260/280/290/295) described above may exist in software, hardware, firmware, or some combination thereof.

The skill computing device(s) 125 and/or the speech processing computing device(s) 120 may reside in a cloud computing environment, a localized computing environment, or some combination thereof. For example, the speech processing enabled device 110 may include computing equipment, some portion of which is configured with all/some of the components/functionality of speech processing computing device(s) 120. The speech processing enabled device 110 may then perform a variety of functions on its own (such as when remote communications are unavailable), and/or may communicate (when capable) with remote based speech processing computing device(s) 120 to perform other functions. Alternatively, all of the functionality may reside on the speech processing enabled device 110 or remotely.

Figure 3:
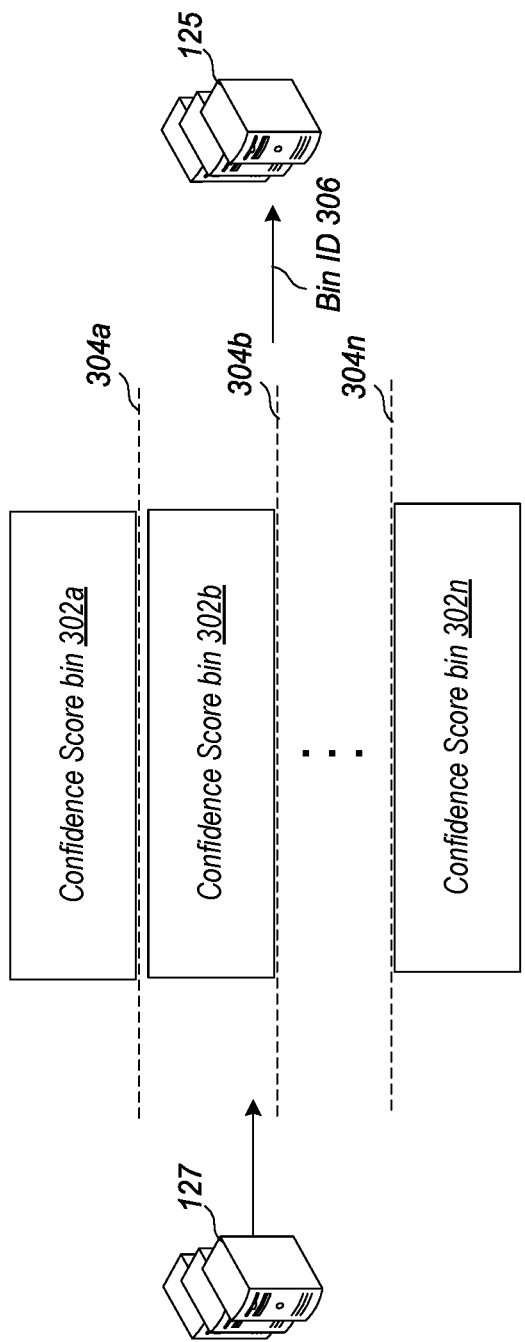
FIG. 3 is a conceptual diagram illustrating determination of a confidence score bin, in accordance with various embodiments described herein.

FIG. 3 is a conceptual diagram illustrating determination of a confidence score bin, in accordance with various embodiments described herein. As previously described, the FIRM service (e.g., FIRM service 295 executing on one or more FIRM service computing devices 127) may determine a confidence score indicating the likelihood that the invocation of the particular speech processing action (e.g., an action executed by one or more skills) is a false invocation. As previously described, the FIRM service may separate confidence scores output by the FIRM service into bins. For example, in FIG. 3, confidence scores are separated into bins 302a, 302b, . . . , 302n. It should be appreciated that any number of bins may be used in accordance with a desired implementation. Each bin may represent a continuous range of confidence scores with each bin being separated from each adjacent bin by a threshold confidence value. For example, bin 302a may represent a high confidence bin (e.g., a range of confidence values indicating that there is a high likelihood that the invocation of the relevant skill action is a false invocation). In the example, bin 302a may include the values 0.75-1.0, although any suitable values may be used in accordance with the desired implementation. In this example, 0.75 may be the threshold value separating bin 302a from adjacent bin 302b. Accordingly, 0.75 may be threshold value 304a.

When FIRM service computing device 127 and/or the FIRM service generally outputs a confidence score (e.g., from an output layer of a machine learning model of the FIRM service), a determination may be made by the FIRM service into which bin the confidence score is included. In another example, confidence score bin 302b may be associated with a range of values from 0.5 (corresponding to low threshold 304b) to 0.75 (corresponding to threshold 304a). Any number of bins (e.g., 302a, 302b, . . . , 302n) may be used and may be associated with a corresponding number of threshold values (e.g., 304a, 304b, . . . , 304n). In various examples, the threshold values may be selected by the FIRM service (and/or by the skill 290 that is communicating with the FIRM service) according to the particular speech processing domain, skill, and/or action that has been invoked (falsely or not).

For example, false invocations of skill actions associated with relatively minor user inconvenience and/or consequences may have thresholds 304a, 304b, . . . 304n set in such a manner that relatively few actions are rejected as false invocations. For example, a weather skill/action that reads out current weather conditions to a user upon request may have a relatively high threshold 304a. In the example, confidence score bin 302a may cause the action to be rejected as a false invocation. Since, in the example, the threshold 304a is relatively high, relatively few invocations of the weather skill/action may have confidence scores that exceed the threshold 304a. Accordingly, relatively few utterances may be rejected as being false invocations. This may be desirable for a weather action and/or weather skill since users may find that the unrequested output of weather-related audio is only a minor annoyance or inconvenience.

By contrast, a communication skill/action that sends text messages to other users may have a relatively low threshold 304a resulting in more utterances being rejected as false utterances (and/or resulting in user confirmation prompts prior to executing the texting action). The threshold 304a may be set to a relatively low value in the context of the communication skill/action as many users may find it to be inconvenient/annoying to inadvertently send messages to other users when such messages were not intended.

In one example implementation, there may be three confidence score bins—a high bin, indicating a high likelihood of a false invocation of the relevant skill/action, a medium bin, indicating a medium likelihood of a false invocation of the relevant skill/action, and a low bin, indicating a low likelihood of a false invocation of the relevant skill/action. Upon determining the bin in which a particular utterance falls (based on the confidence score generated by the FIRM service and based on the relevant thresholds between the bins), the bin ID 306 may be sent to the skill computing device 125 and/or to the relevant skill (e.g., the invoked skill) executing thereon. The skill may associate the bin ID 306 with a particular action. For example, if the bin ID 306 indicates the high bin, the skill may reject the invocation as false and may send an end session signal to the orchestrator 230 to end the dialog session. If the bin ID 306 indicates the medium bin, the skill may use local logic of either the skill and/or the speech processing computing device(s) 120 to send a prompt to the user to confirm the invocation (e.g., "Ok, would you like me to send your message to Brad?"). If the bin ID 306 indicates the low bin, the skill may perform the invoked action without prompting the user.

FIRM Implementation Details

A false invocation of a skill and/or skill action may occur as a result of: (1) a false wake, which occurs when the system goes into listening mode but when no wakeword has actually been spoken, or (2) a false intent, in which an utterance is incorrectly classified by NLU and is then routed to the wrong skill. In various examples, both error types may be considered by the FIRM service. In an example, a false invocations may be encoded as "1," while other utterances may be encoded as "0". In various examples, binary cross entropy may be used as a loss function for the false invocation rejection model, where loss, J, may be defined in terms of the predicted outcome, p, and the ground truth outcome, y, in equation (1) below:

$$J=-(y\log(p)+(1-y)\log(1-p)) \qquad (1)$$

However, other loss functions may be used depending on the desired implementation. Various machine learning algorithms may be used to implement the FIRM service 295. For example, gradient boosting machines (GBM), random forests (RF), K nearest neighbors (KNN), deep neural networks (DNN), etc., may be used in accordance with the desired implementation. In various examples, GBM may be faster during runtime relative to RF with a large number of trees. Similarly, various activation functions may be used (e.g., ReLU, tanh, leaky ReLU, etc.).

Features for False Invocation Rejection Model

Various feature data may be extracted from speech processing computing device(s) 120 for use by the FIRM service to determine a likelihood of a false invocation of a relevant skill action. Table 1, below, describes some exemplary features. However, other features may be used, in accordance with the desired implementation.

TABLE 1

Selected raw features used for modeling

| Feature Name | Description |
| --- | --- |
| ASR Utterance Confidence | Overall ASR confidence in the utterance |
| ASR Token Confidence | The ASR token (word) confidence for each token |
| Utterance Duration | The duration of the extracted utterances (e.g., in seconds) |
| Stream Duration | The duration of the open stream (e.g., the audio stream received from the speech processing computing device(s) 120) |
| Number of tokens | Number of tokens output from ASR |
| Device Directedness | The score from a separate directedness model |
| NLU H1 Confidence | Score NLU confidence for the top hypothesis |
| NLU H1 Confidence | Bin NLU confidence bin for the top hypothesis |
| NLU Intent | Top NLU hypothesis of intent (1 feature per possible intent) |
| NLU Classification Type | Statistical vs Deterministic (separate features) |
| NLU Slots | Presence of a given slot (separate feature per slot) |
| ER Confidence Score | Entity Recognition confidence for top hypothesis |
| ER Confidence Bin | Entity Recognition bin for the top hypothesis |
| ER Match Type | Separate features for exact match, prefix match, etc. |
| Device Type | The type of speech processing enabled device 110 used |
| Volume of Player | The volume of the device (text-to-speech, media, etc.) |
| Arbitration Confidence | Per-candidate skill confidence level generated by arbitration component 298 indicating confidence that the candidate skill is appropriate to process the utterance |

IC-Weighted ASR Confidence

In various examples, Intent Classification (IC) Weighted ASR Confidence may be a useful feature for predicting false invocations of skill actions. In many examples, a greater likelihood of false invocation may be expected when a low ASR token confidence is paired with a token that is highly important for NLU intent classification. For example, suppose the speech processing system (e.g., a speech processing system executed by speech processing computing device(s) 120) has hypothesized a call intent based on the ASR transcription of "can you call bob." The word "call" may be much more valuable in the determination of a call intent classification relative to the words "can" and "you." Thus, if ASR token confidence for "call" is low, the suspicion that the utterance represents a false invocation of the call intent should be raised. A related example is depicted below in Table 2.

In various examples, a helper maximum entropy intent classifier may be used to generate the intent classification scores for the IC-weighted ASR Confidence feature. The helper maximum entropy intent classifier model may be trained on labeled utterances (e.g., utterances annotated by humans). The helper model's feature weights may be extracted for every n-gram and for the associated intent. The helper model's feature weights then represent n-gram-specific IC feature scores. For a given utterance, the inverse ASR confidence value, $1/a_i$, of the token in each n-gram may be multiplied by the n-gram's IC score, $w_i$. The summation of $1/a_i\ w_i$ may be divided by the sum of all the IC scores, yielding the IC-Weighted ASR Confidence value, $\alpha$. See Equation 2 below. A helper model may be used to generate the IC scores if the model of the FIRM service is a neural network. However, in other example implementations (e.g., if the intent classification model is a clear-boxed model, such as maximum entropy), the weights from the NLU model may be used directly.

TABLE 2

An example calculation for $\alpha$, the IC-weighted ASR Confidence.

$$\alpha = \left[ \frac{\Sigma\left(w_i \frac{1}{a_i}\right)}{\Sigma w_i} \right]^{-1} \tag{2}$$

| i | n-gram | Token | $a_i$ | $w_i$ |
|---|--------|-------|-----|-----|
| 1 | drop | drop | 940 | 4.08 |
| 2 | in | in | 915 | 2.25 |
| 3 | on | on | 928 | 2.01 |
| 4 | drop-in | drop | 942 | 0.71 |
| 5 | drop-in | in | 915 | 0.71 |
| 6 | in-on | in | 915 | 0.18 |
| 7 | in-on | on | 928 | 0.18 |
| 8 | drop-in-on | drop | 942 | 0.28 |
| 9 | drop-in-on | in | 915 | 0.28 |
| 10 | drip-in-on | on | 928 | 0.28 |
| 11 | on-bob | on | 928 | 0.26 |
| 12 | on-bob | bob | 754 | 0.26 |
| 13 | in-on-bob | in | 915 | 0.09 |
| 14 | in-on-bob | on | 928 | 0.09 |
| 15 | in-on-bob | bob | 754 | 0.09 |
| 16 | bob | bob | 754 | 0.07 |

$$\alpha = \left[ \frac{4.08 \cdot \frac{1}{940} + 2.25 \cdot \frac{1}{915} + \ldots + 0.07 \cdot \frac{1}{754}}{4.08 + 2.25 + \ldots + 0.07} \right]^{-1} = 922$$

Although in various examples described above, NLU confidence data may be used as a feature for determining the false invocation data (e.g., a confidence score indicating the likelihood of a false invocation of a particular skill and/or skill action), in various other examples, any spoken language processing confidence data may be used to predict a false invocation. For example, for a given utterance, work/token embeddings may be determined for the utterance and a vector of confidences (e.g., ASR token confidences) may be generated and used by the FIRM service to determine the false invocation data. In other examples, NLU confidence data alone or in combination with other features described herein may be used to determine a false invocation. In general, any type of spoken language processing data (e.g., confidence data generated by any component of a spoken language processing system such as ASR component 250, natural language component 260, arbitration component 298) may be used alone or in combination with one or more other types of spoken language processing data to predict a false invocation of a speech-processing skill and/or skill action. In various examples, ancillary spoken language processing data may be used to predict false invocation. For example, utterance duration, streaming duration, player volume, player type, etc., may be used alone and/or in combination with other feature data described above to determine a likelihood that an invocation of a skill and/or a skill action represents a false invocation.

Figure 4:
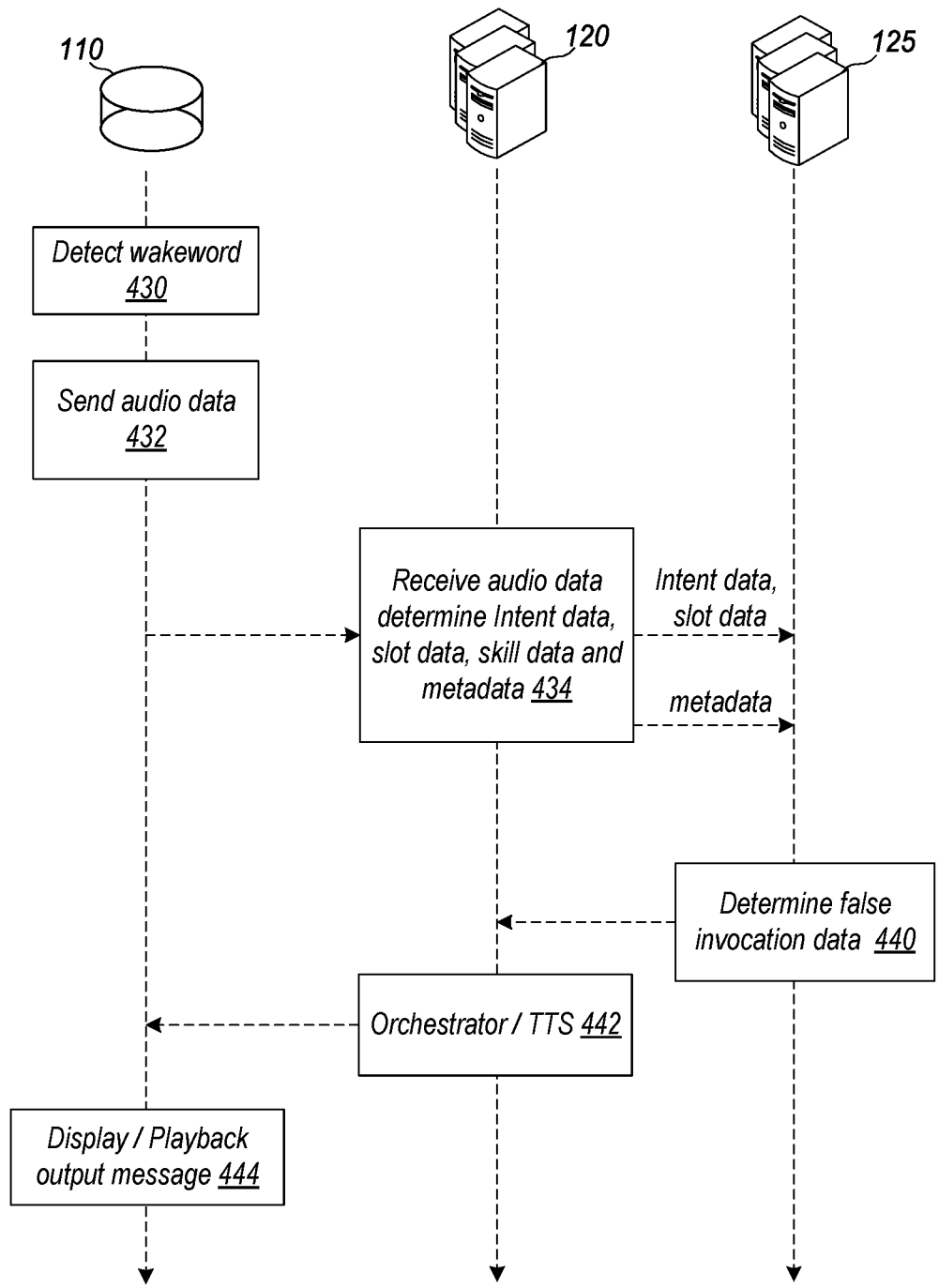
FIG. 4 is a timing diagram illustrating an example set of operations that may be used in accordance with false invocation rejection for speech processing systems, in accordance with various embodiments described herein.

FIG. 4 is a timing diagram illustrating an example set of operations that may be used in accordance with false invocation rejection for speech processing systems, in accordance with various embodiments described herein.

In the example embodiment depicted in FIG. 4, speech processing enabled device 110 may detect a wakeword at action 430. The wakeword may be detected either because a user of speech processing enabled device 110 uttered the wakeword or because a sound resembling the wakeword was incorrectly determined by the wakeword component of speech processing enabled device 110 to be the wakeword. Upon detection of the wakeword, speech processing enabled device 110 may send audio data to speech processing computing device(s) 120 at action 432.

At action 434, speech processing computing device(s) 120 may receive audio data and may perform ASR processing to determine text data representing the received audio data. Additionally, as described above, the ASR component may generate metadata (e.g., confidence scores associated with the ASR transcription of the audio data). The text data may be sent to an NLU component of the speech processing computing device(s) 120 for NLU processing. As described herein, the NLU component may generate intent data and/or slot data comprising a semantic representation of the text data received from the ASR component. Additionally, the NLU component and/or an entity recognition component may generate metadata associated with NLU processing/ER processing (e.g., a confidence score associated with the top-ranked NLU intent, a confidence score associated with the top-ranked NLU skill hypothesis, etc.).

The intent data, slot data, entity recognition data, utterance data, metadata associated with the utterance data, etc., may be sent from speech processing computing device(s) 120 to skill computing device(s) 125. In various examples, false invocation confidence scores may be determined for the utterance at action 440. As previously described, the skill executing at skill computing device(s) 125 invoked by the utterance (as determined by speech processing computing device(s) 120) may use a FIRM client stored in a library to call to the FIRM service. Alternatively, the FIRM service may be stored on and executed by the skill locally at skill computing device(s) 125. In some further examples, the FIRM service may be instantiated in arbitration component 298 (FIG. 2) deployed downstream from one or more speech-processing components and prior to processing by a selected skill. At action 440, the FIRM service may generate feature data from the metadata associated with the utterance generated by the speech processing system executing on speech processing computing device(s) 120. For examples of feature data, see Table 1, above. At action 440, the FIRM service may determine a false invocation data (e.g., a false invocation confidence score) representing a likelihood that the skill and/or relevant skill action has been falsely invoked. Additionally, as previously described above in reference to FIG. 3, the FIRM service may determine a confidence score bin for the false invocation data.

At action 442 the FIRM service and/or the skill may send a signal indicating an action corresponding to the relevant confidence score bin to the orchestrator and/or TTS component of speech processing computing device(s) 120. For example, the Bin ID for a particular utterance may be associated with a false invocation. In such an example, the skill may send an "end dialog session" signal to the orchestrator of speech processing computing device(s) 120 effective to cause the orchestrator to instruct the speech processing enabled device 110 to end the dialog session by ceasing to transmit audio data and/or by turning off an indicator light indicating that the speech processing enabled device 110 is in listening mode, for example. In another example, the Bin ID may be associated with false invocation confidence levels that require that a user be prompted to confirm the relevant skill action prior to executing the action. Accordingly, a signal may be sent to the TTS component of the speech processing computing device(s) 120 indicating text data that may represent a prompt for the user to confirm the invoked skill action. The TTS component may generate audio data for the user prompt and may send the audio data to speech processing enabled device 110 for playback at action 444. In some examples, the skill may instead/also prompt the user visually and may send image data to be displayed by a display of speech processing enabled device 110. In some other examples, the Bin ID may indicate that there is a low likelihood of a false invocation of the relevant skill/action. Accordingly, the skill computing device 125 may carry out the relevant skill action as normal.

FIG. 5A is a block diagram showing an example architecture 500 of a computing device (e.g., speech processing enabled device 110), in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). In some examples, the processing element 504 may be effective to determine a wakeword and/or to stream audio data to speech processing computing device(s) 120. The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500. In some examples, the transfer application 524 may also be configured to send the received voice requests to one or more voice recognition servers (e.g., speech processing computing device(s) 120).

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display content determined provided by a skill executed by skill computing device(s) 125.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. Voice recognition engine 580 may interpret audio signals of sound captured by microphone 570. In some examples, voice recognition engine 580 may listen for a "wakeword" to be received by microphone 570. Upon receipt of the wakeword, voice recognition engine 580 may stream audio to a voice recognition server for analysis, such as speech processing computing device(s) 120. In various examples, voice recognition engine 580 may stream audio to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5A. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

Figure 5B:
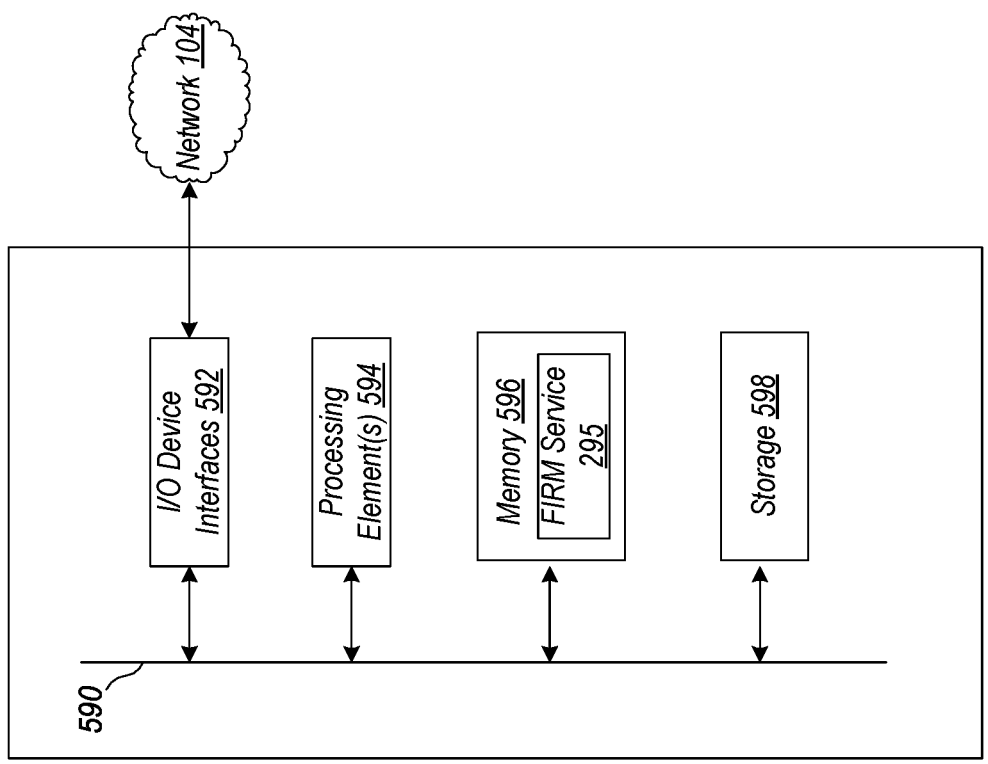

FIG. 5B is a block diagram conceptually illustrating example components of a remote device, such as the skill computing device(s) 125, FIRM service computing device(s) 127, and/or speech processing computing device(s) 120, which may assist with ASR processing, NLU processing, applicable protocol recognition, skill execution, false invocation rejection, and/or command processing. Multiple computing devices 127, skill computing device(s) 125, and/or speech processing computing device(s) 120 may be included in the system, such as one speech processing computing device 120 for performing ASR processing, one speech processing computing device 120 for performing NLU processing, one or more FIRM service computing devices 127 (and/or 125) implementing FIRM service 295, one or more skill computing device(s) 125 implementing skills, etc. In operation, each of these devices (or groups of devices) may include computer-readable and computer-executable instructions that reside on the respective device, as will be discussed further below.

Each of these devices (120/125/127) may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for a particular utterance. In some examples, memory 596 may store machine learning models of the FIRM service when loaded from storage 598. In various further examples, memory 596 may be effective to store instructions effective to program controllers/processors 594 to perform the various techniques described above in reference to FIRM service 295 in FIGS. 1-4. Accordingly, in FIG. 5B, FIRM service 295 is depicted as being stored within memory 596. The memories 596 may individually include volatile random access memory (RAM), non-volatile read only memory (ROM), non-volatile magnetoresistive memory (MRAM), and/or other types of memory. Each device (120/125/127) may also include a data storage component 598 for storing data and controller/processor-executable instructions. Each data storage component 598 may individually include one or more non-volatile storage types such as magnetic storage, optical storage, solid-state storage, etc. Each device (120/ 125/127) may also be connected to removable or external non-volatile memory and/or storage (such as a removable memory card, memory key drive, networked storage, etc.) through respective input/output device interfaces 592. In various examples, feature data described above in Table 1 and the various machine learning models used in different implementations of the FIRM service 295, may be stored in memory 596 and/or storage 598.

Computer instructions for operating each device (120/ 125/127) and its various components may be executed by the respective device's processing element(s) 594, using the memory 596 as temporary "working" storage at runtime. A device's computer instructions may be stored in a non-transitory manner in non-volatile memory 596 (e.g., a non-transitory computer-readable memory), storage 598, or an external device(s). Alternatively, some or all of the executable instructions may be embedded in hardware or firmware on the respective device in addition to or instead of software.

Each device (120/125/127) includes input/output device interfaces 592. A variety of components may be connected through the input/output device interfaces 592, as will be discussed further below. Additionally, each device (120/125/ 127) may include an address/data bus 590 for conveying data among components of the respective device. Each component within a device (120/125/127) may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of the FIRM service computing device(s) 127 and the speech processing computing device(s) 120, as described herein, are exemplary, and may be located as a stand-alone device or may be included, in whole or in part, as a component of a larger device or system.

Figure 6:
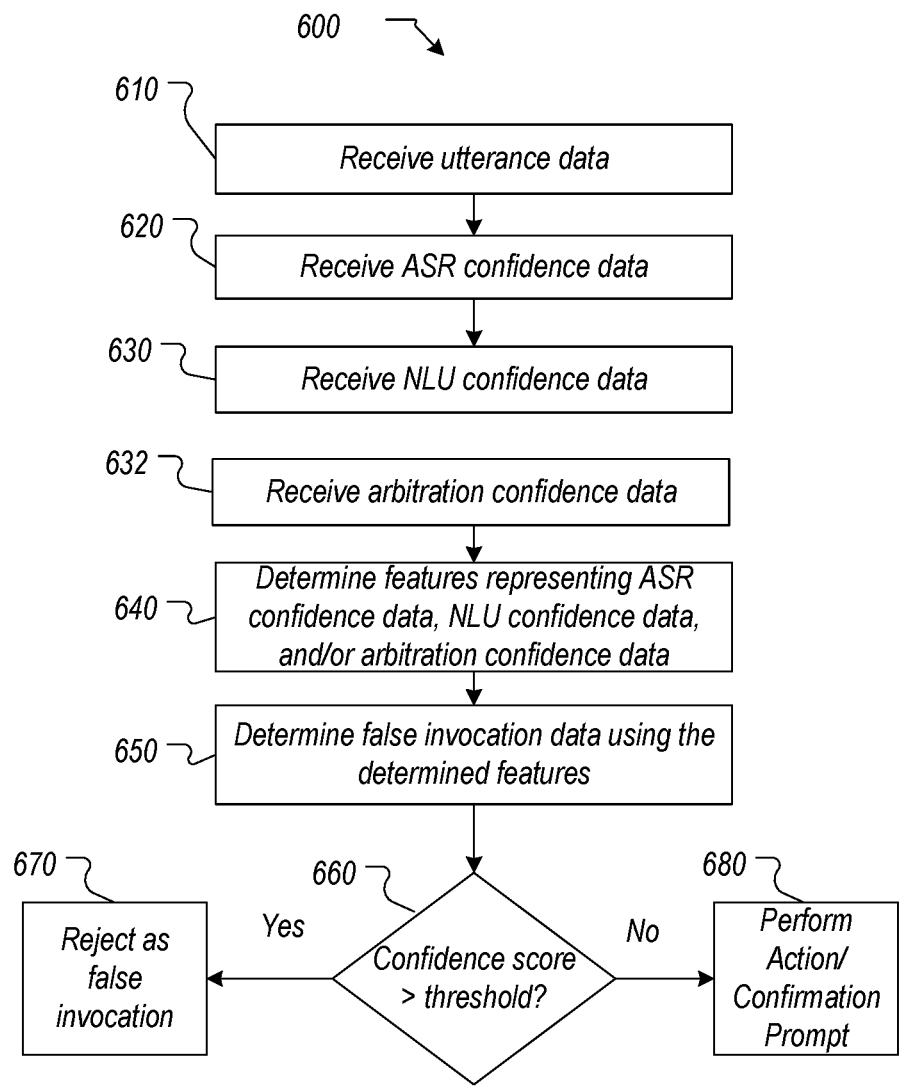
FIG. 6 depicts a flow chart showing an example process for providing false invocation rejection in a speech processing system, in accordance with various aspects of the present disclosure.

FIG. 6 depicts a flow chart showing an example process 600 for providing false invocation rejection in a speech processing system, in accordance with various aspects of the present disclosure. Those portions of FIG. 6 that have been previously discussed in reference to FIGS. 1-5B may not be described again for purposes of clarity and brevity. The actions of the process 600 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 600 may begin at action 610, "Receive utterance data." At action 610, utterance data may be received. In some examples, the utterance data may be received by a speech processing skill selected for processing the intent data determined by Natural language component 260. In some other examples, the utterance data may be received by the FIRM service 295, which may be separate from the skill selected for processing the intent data determined by Natural language component 260.

Processing may continue from action 610 to action 620, "Receive ASR confidence data." At action 620, the speech processing skill and/or the FIRM service 295 may receive ASR confidence data. The ASR confidence data may comprise the raw data used to generate one or more of the ASR-related confidence features described in Table 1, above.

Processing may continue from action 620 to action 630, "Receive NLU confidence data." At action 630, the speech processing skill and/or the FIRM service 295 may receive NLU confidence data. The NLU confidence data may comprise the raw data used to generate one or more of the NLU-related confidence features described in Table 1, above.

Processing may continue from action 630 to action 632, "Receive arbitration confidence data." At action 632, the speech processing skill and/or the FIRM service 295 may receive arbitration confidence data. The arbitration confidence data may comprise the raw data used to generate the arbitration confidence feature described in Table 1, above. For example, arbitration confidence data may be generated by arbitration component 298. Arbitration confidence data may be a confidence score indicating a likelihood that a candidate skill is appropriate to process a request included in an utterance (or other natural language input). In various examples, arbitration confidence data may be generated for each skill determined by arbitration component 298 as being a candidate skill for processing the current utterance.

In various examples, one or more of actions 620, 630, and/or 632 may be optional in a particular implementation. For example, in various embodiments, the FIRM service 295 may use ASR confidence data as a feature input, but not NLU confidence data and/or arbitration confidence data. In various other examples, the FIRM service 295 may use NLU confidence data as a feature input, but not ASR confidence data and/or arbitration confidence data, and so on. In general, the machine learning models of the FIRM service 295 may be trained to use various different features and/or combinations of data generated by the spoken language processing systems (and/or components thereof) described herein.

Processing may continue from action 632 to action 640, "Determine features representing ASR confidence data, NLU confidence data, and/or arbitration confidence data." At action 640, feature representations of the NLU confidence data, arbitration confidence data, and/or the ASR confidence data may be generated. In various examples, the machine learning model of the FIRM service 295 may learn and extract the relevant features from the raw ASR, arbitration, and/or NLU confidence data. In other examples, the feature data may be generated according to computer-executable instructions stored in a non-transitory computer-readable memory (e.g., memory 596 and/or storage 598). The extracted feature data may be sent to an input layer of FIRM service 295. In other examples where the feature data is extracted by the FIRM service 295, the feature data may be passed to a subsequent layer of the FIRM service 295 model. As previously described, in other implementations, the FIRM service 295 may use different feature data and/or a different combination of feature data apart from the feature data extracted from the ASR confidence data, arbitration confidence data, and/or NLU confidence data specifically described in reference to FIG. 6.

Processing may continue from action 640 to action 650, "Determine false invocation data using the determined features." At action 650, the false invocation data may be determined as an output of one or more machine learning models of the FIRM service 295. For example, if a neural network is used, the false invocation data may be determined from activations of neurons in an output layer of the FIRM neural network. In various examples, the false invocation data may comprise a confidence score indicating a likelihood and/or probability that the utterance data received at action 610 represents a false invocation of the invoked speech processing skill (and/or a skill action of that skill).

Processing may continue from action 650 to action 660 at which a determination may be made whether the confidence score exceeds a particular false invocation threshold. In various examples, if the confidence score of the false invocation data exceeds the threshold, the invocation of the speech processing skill may be determined to be a false invocation. Accordingly, at action 670, the utterance may be rejected as a false invocation. In various examples, the skill and/or the FIRM service 295 may send a signal to the speech processing system (e.g., speech processing computing device(s) 120) instructing the speech processing system to end the current dialog session. The speech processing system may, in turn, send a signal to the speech processing enabled device 110. The signal may be effective to cause the speech processing enabled device 110 to cease streaming audio to the speech processing system and may return to listening mode until a subsequent wakeword is detected. Additionally, in some examples, the signal may be effective to turn off an indicator light and/or display of the speech processing enabled device 110.

In some other examples, if the confidence score does not exceed the threshold at action 660, processing may proceed to action 680. At action 680, the relevant skill action may be performed by the skill or a prompt for user confirmation may be generated and sent to a TTS component of the speech processing system. As previously described, in various examples, other thresholds may be used to determine whether or not to prompt the user for confirmation, or whether to carry out the action without prompting the user. In various examples, the thresholds may be selected based on the domain of the speech processing skill and/or the relevant action of the speech processing skill.

Figure 7:
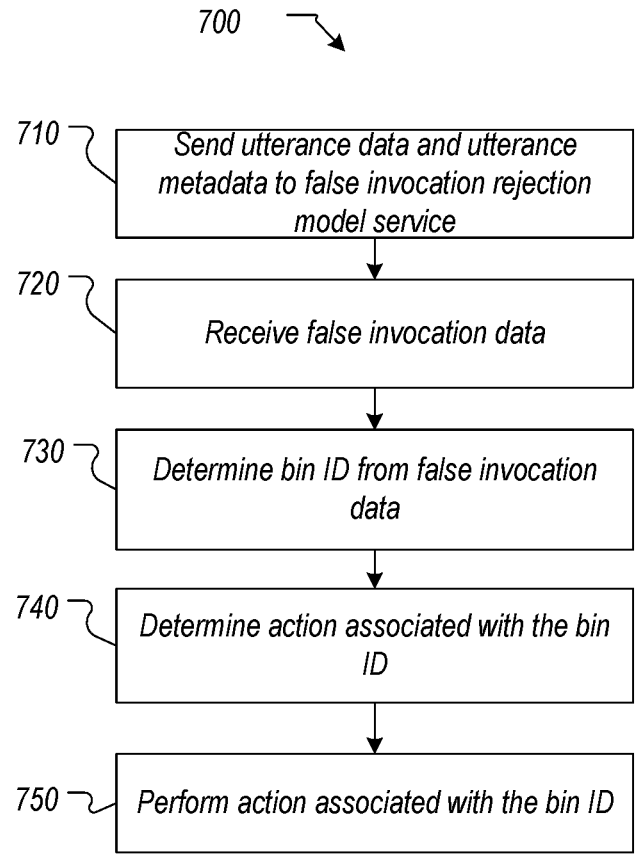
FIG. 7 depicts a flow chart showing an example process to determine an action to perform after false invocation determination, in accordance with various aspects of the present disclosure.

FIG. 7 depicts a flow chart showing an example process 700 to determine an action to perform after false invocation determination, in accordance with various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure. As previously described, in various examples, FIRM service 295 may be implemented by one or more skills 290. However, in at least some examples, FIRM service 295 may be implemented by speech processing computing device(s) 120 (and/or one or more components thereof) and/or by FIRM service computing device(s) 127. Accordingly, in various examples, the various actions described in reference to FIG. 7 may be performed by a speech processing skill and/or by some combination of a speech processing skill and a speech processing system interacting with a speech processing skill.

In some examples, process 700 may begin at action 710, "Send utterance data and utterance metadata to false invocation rejection model service." In various examples, the utterance data may include intents and/or slots determined by natural language component 260, text data determined by ASR component 250, audio data representing the utterance, etc. Utterance metadata may include various data determined during speech processing. For example, utterance metadata may comprise the raw data used to generate one or more of the features described in Table 1, above.

In some examples, process 700 may proceed from action 710 to action 720, "Receive false invocation data." At action 720, a speech processing skill selected by the speech processing system executed by speech processing computing device(s) 120 for processing the utterance may receive false invocation data from FIRM service computing device(s) 127. In various examples, the speech processing skill may receive the false invocation data in response to calling the FIRM service 295 using a FIRM client in a library of the skill. The false invocation data may include data indicating whether or not the invocation of the skill (and/or skill action) by the utterance has been predicted by the FIRM service 295 to be a false invocation. In various examples, the false invocation data may include a confidence score indicating a likelihood that the invocation of the skill/skill action is (or is not) a false invocation.

Process 700 may proceed from action 720 to action 730, "Determine bin ID from false invocation data." In various examples, the false invocation data may comprise a bin identifier. The bin identifier may identify a bin of confidence scores that may be associated with a particular action to be performed. In various examples, the threshold confidence scores separating the two or more bins may be adjusted based on a particular domain of the invoked speech processing skill and/or skill action. For example, a skill and/or skill action that would likely cause great annoyance to a user if falsely invoked (e.g., a purchase command, a communication command, etc.) may have a relatively low false rejection confidence score threshold such that rejection of false invocations of the skill/skill action may occur more frequently. Conversely, a skill and/or skill action that would be relatively unlikely to cause great annoyance to a user if falsely invoked (e.g., a music skill, a weather skill, etc.) may have a relatively high false rejection confidence score threshold such that rejection of false invocations of the skill/skill action may occur less frequently.

Process 700 may proceed from action 730 to action 740, "Determine action associated with the bin ID." At action 740, the skill may determine an action associated with the bin ID. For example, the bin identified by the received bin ID may be associated with an action instructing the skill to reject the utterance as a false invocation. Accordingly, the skill may ignore the utterance and may send a signal to the speech processing system instructing the speech processing system to end the dialog session with the speech processing enabled device. In another example, the bin identified by the received bin ID may be associated with an action instructing the skill to seek user confirmation prior to performing the action. Accordingly, the skill may send confirmation data to the speech processing system effective to cause the speech processing system to prompt the user to confirm the relevant skill action (e.g., through a TTS component of the speech processing system). In another example, the bin identified by the received bin ID may be associated with an action instructing the skill to process the utterance, as the invocation of the skill/skill action has been determined to be a proper invocation. Process 700 may proceed from action 740 to action 750. At action 750, the action determined at action 740 of process 700 may be carried out by the speech processing skill. For example, the speech processing skill may send a signal to speech processing computing device(s) 120 effective to cause one or more components of speech processing computing device(s) 120 to take an action associated with the relevant bin.

Figure 8:
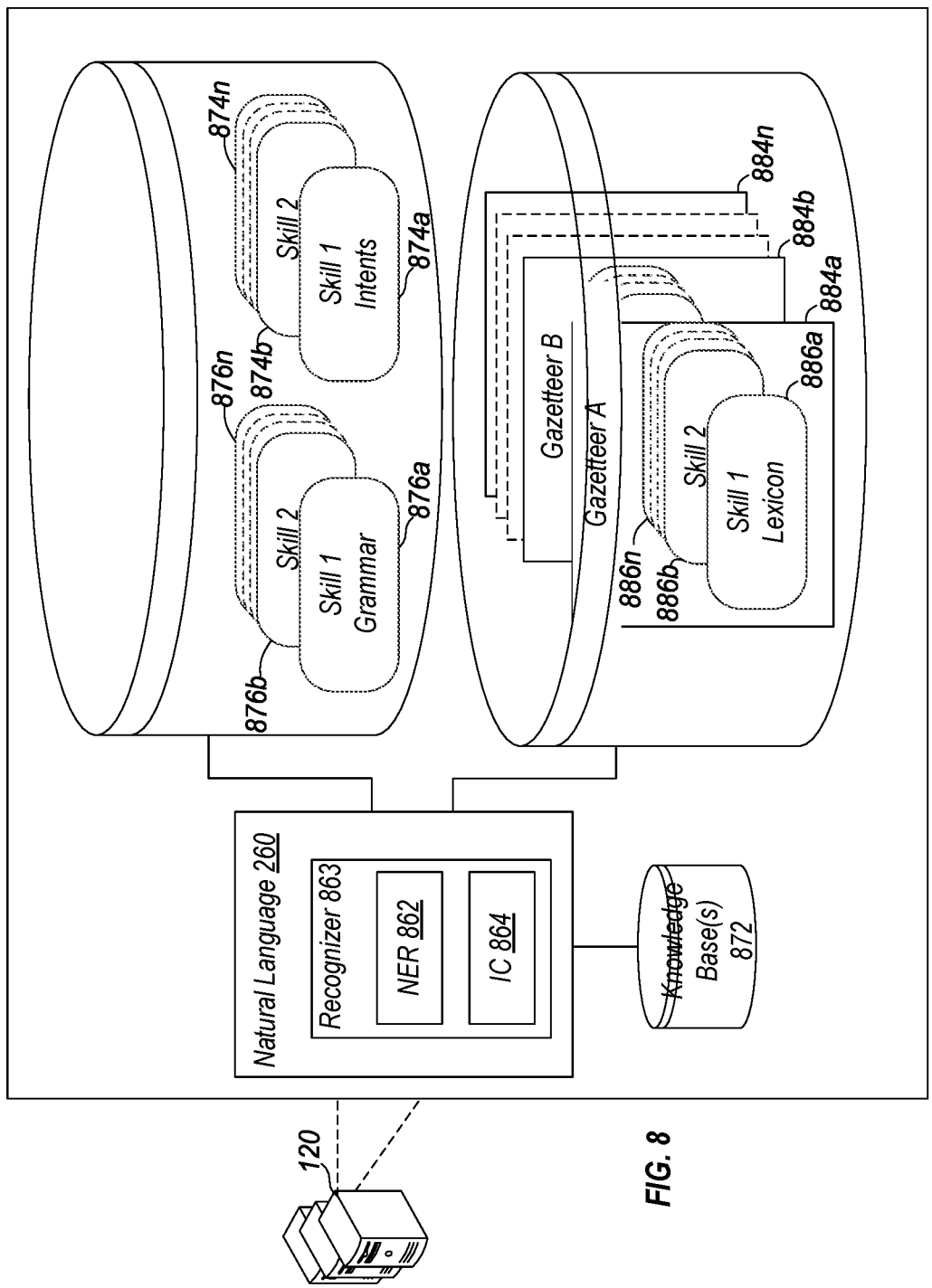
FIG. 8 is a conceptual diagram illustrating how natural language understanding processing is performed according to embodiments of the present disclosure.

FIG. 8 illustrates how NLU processing is performed on text data. Generally, the Natural language component 260 attempts to make a semantic interpretation of text data input thereto. That is, the natural language component 260 determines the meaning behind text data based on the individual words and/or phrases represented therein. The natural language component 260 interprets text data to derive an intent of the user as well as pieces of the text data that allow a device (e.g., the speech processing enabled device 110, the speech processing computing device(s) 120, etc.) to complete that action.

The natural language component 260 may process text data including several ASR hypotheses. The natural language component 260 may process all (or a portion of) the ASR hypotheses input therein. Even though the ASR component 250 may output multiple ASR hypotheses, the natural language component 260 may be configured to only process with respect to the top scoring ASR hypothesis. Additionally, as described herein, the ASR component 250 may generate confidence scores associated with each hypothesis (e.g., the confidence scores described above in reference to Table 1). The confidence scores may be used to generate feature data for input into machine learning models of the FIRM service 295.

The natural language component 260 may include one or more recognizers 863. Each recognizer 863 may be associated with a different skill. Each recognizer 863 may process with respect to text data input to the natural language component 260. Each recognizer 863 may operate at least partially in parallel with other recognizers 863 of the natural language component 260.

Each recognizer 863 may include a named entity recognition (NER) component 862. The NER component 862 attempts to identify grammars and lexical information that may be used to construe meaning with respect to text data input therein. The NER component 862 identifies portions of text data that correspond to a named entity that may be applicable to processing performed by a skill. The NER component 862 (or other component of the natural language component 260) may also determine whether a word refers to an entity whose identity is not explicitly mentioned in the text data, for example "him," "her," "it" or other anaphora, exophora or the like.

Each recognizer 863, and more specifically each NER component 862, may be associated with a particular grammar model and/or database, a particular set of intents/actions (e.g., in intents database 874), and a particular personalized lexicon 886. Each gazetteer 884 may include skill-indexed lexical information associated with a particular user and/or speech processing enabled device 110. For example, a Gazetteer A (884a) includes skill-indexed lexicon 886a to 886n. A user's music skill lexical information might include album titles, artist names, and song names, for example, whereas a user's contact list skill lexical information might include the names of contacts. Since every user's music collection and contact list is presumably different, this personalized information improves entity resolution.

An NER component 862 applies grammar models 876 and lexicon 886 to determine a mention of one or more entities in text data. In this manner, the NER component 862 identifies "slots" (corresponding to one or more particular words in text data) that may be used for later processing. The NER component 862 may also label each slot with a type (e.g., noun, place, city, artist name, song name, etc.). As previously described, each recognizer 863 may generate confidence scores associated with each named entity and/or with each match of a named entity. The confidence scores may be used to generate feature data for input into machine learning models of FIRM service 295.

Each grammar model 876 includes the names of entities (i.e., nouns) commonly found in speech about the particular skill to which the grammar model 876 relates, whereas the lexicon 886 is personalized to the user and/or the speech processing enabled device 110 from which the user input originated. For example, a grammar model 876 associated with a shopping skill may include a database of words commonly used when people discuss shopping.

Each recognizer 863 may also include an intent classification (IC) component 864. An IC component 864 parses text data to determine an intent(s). An intent represents an action a user desires be performed. An IC component 864 may communicate with an intents database 874 of words linked to intents. For example, a music intent database may link words and phrases such as "quiet," "volume off," and "mute" to a <Mute> intent. An IC component 864 identifies potential intents by comparing words and phrases in text data to the words and phrases in an intents database 874.

The intents identifiable by a specific IC component 864 are linked to skill-specific grammar models 876 with "slots" to be filled. Each slot of a grammar model 876 corresponds to a portion of text data that the system believes corresponds to an entity. For example, a grammar model 876 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar models 876 may not be structured as sentences, but rather based on associating slots with grammatical tags.

For example, an NER component 862 may parse text data to identify words as subject, object, verb, preposition, etc. based on grammar rules and/or models prior to recognizing named entities in the text data. An IC component 864 (e.g., implemented by the same recognizer 863 as the NER component 862) may use the identified verb to identify an intent. The NER component 862 may then determine a grammar model 876 associated with the identified intent. For example, a grammar model 876 for an intent corresponding to <PlayMusic> may specify a list of slots applicable to play the identified "object" and any object modifier (e.g., a prepositional phrase), such as {Artist Name}, {Album Name}, {Song name}, etc. The NER component 862 may then search corresponding fields in a lexicon 886, attempting to match words and phrases in text data the NER component 862 previously tagged as a grammatical object or object modifier with those identified in the lexicon 886.

An NER component 862 may perform semantic tagging, which is the labeling of a word or combination of words according to their type/semantic meaning. An NER component 862 may parse text data using heuristic grammar rules, or a model may be constructed using techniques such as hidden Markov models, maximum entropy models, log linear models, conditional random fields (CRF), and the like. For example, an NER component 862 implemented by a music recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 862 identifies "Play" as a verb, which an IC component 864 may determine corresponds to a <PlayMusic> intent. At this stage, no determination has been made as to the meaning of "mother's little helper" and "the rolling stones," but based on grammar rules and models, the NER component 862 has determined the text of these phrases relates to the grammatical object (i.e., entity) of the user input represented in the text data.

The models linked to the intent are then used to determine what database fields should be searched to determine the meaning of these phrases, such as searching a user's gazetteer 884 for similarity with the model slots. For example, a model for a <PlayMusic> intent might indicate to attempt to resolve the identified object based on {Artist Name}, {Album Name}, and {Song name}, and another model for the same intent might indicate to attempt to resolve the object modifier based on {Artist Name}, and resolve the object based on {Album Name} and {Song Name} linked to the identified {Artist Name}. If the search of the gazetteer 884 does not resolve a slot/field using gazetteer information, the NER component 862 may search a database of generic words (e.g., in the knowledge base 872). For example, if the text data includes "play songs by the rolling stones," after failing to determine an album name or song name called "songs" by "the rolling stones," the NER component 862 may search the database for the word "songs." In the alternative, generic words may be checked before the gazetteer information, or both may be tried, potentially producing two different results.

An NER component 862 may tag text data to attribute meaning thereto. For example, an NER component 862 may tag "play mother's little helper by the rolling stones" as: {skill} Music, {intent}<PlayMusic>, {artist name} rolling stones, {media type} SONG, and {song title} mother's little helper. For further example, the NER component 862 may tag "play songs by the rolling stones" as: {skill} Music, {intent}<PlayMusic>, {artist name} rolling stones, and {media type} SONG.

Figure 9:
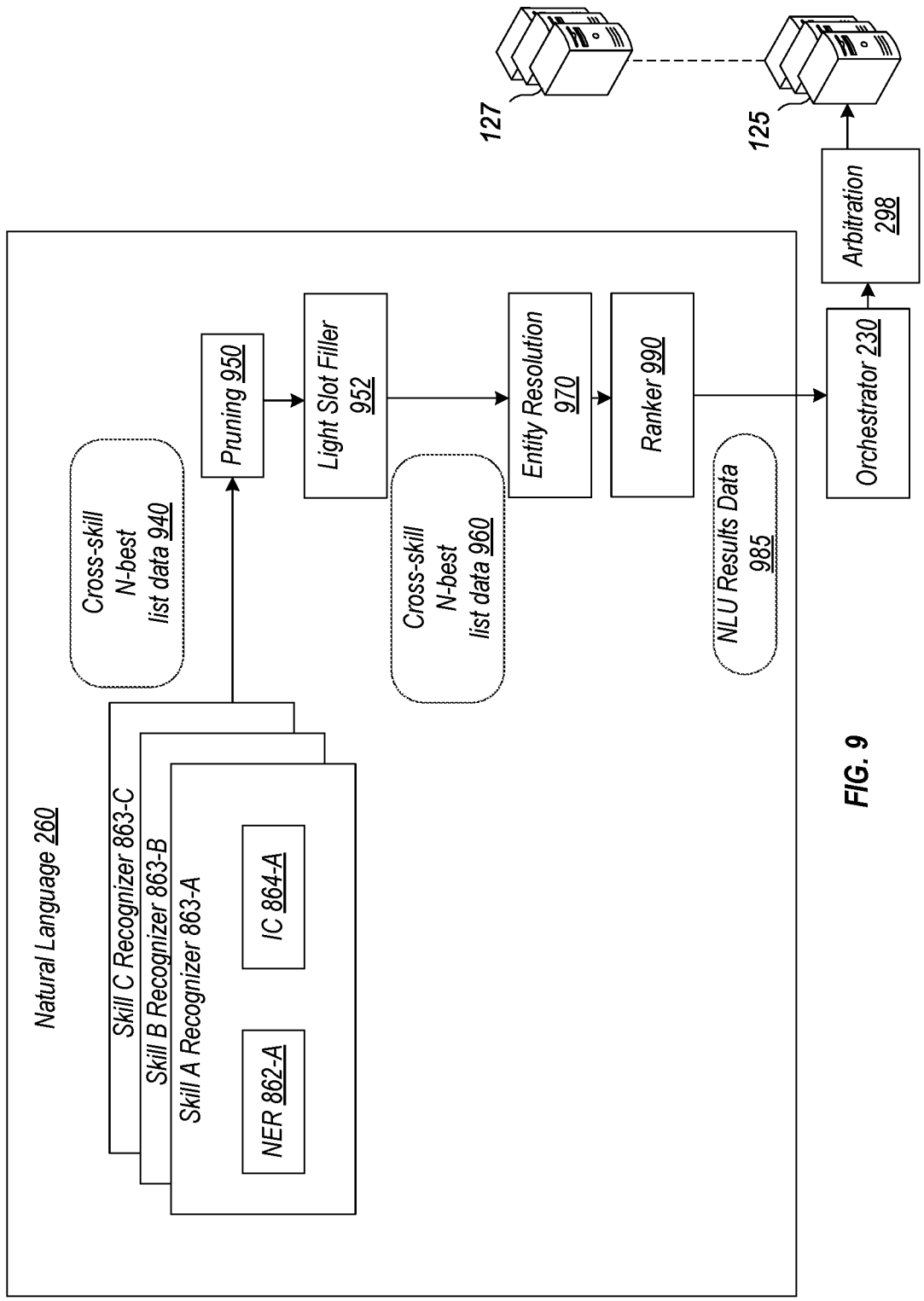
FIG. 9 is a conceptual diagram illustrating how natural language understanding processing is performed according to embodiments of the present disclosure.

The natural language component 260 may generate cross-skill N-best list data 940, which may include a list of NLU hypotheses output by each recognizer 863 (as illustrated in FIG. 9). A recognizer 863 may output tagged text data generated by an NER component 862 and an IC component 864 operated by the recognizer 863, as described above. Each NLU hypothesis including an intent indicator and text/slots may be grouped as an NLU hypothesis represented in the cross-skill N-best list data 940. Each NLU hypothesis may also be associated with one or more respective confidence score(s) for the NLU hypothesis. For example, the cross-skill N-best list data 940 may be represented as, with each line representing a separate NLU hypothesis:

[0.95] Intent: <PlayMusic> ArtistName: Lady Gaga SongName: Poker Face

[0.95] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

As previously described, in various examples, the confidence scores output by the natural language component 260 may be used as input features by machine learning models of the FIRM service 295. In at least some examples, speech processing data may comprise NLU data generated by natural language component 260. For example, NLU data may indicate that a user interrupted an action related to content displayed on speech processing enabled device 110 while in an ambient state. In another example, NLU data may indicate that a user invoked a skill related to content output by a speech processing enabled device 110.

In various examples, the cross-skill N-best list data 940 and/or 960 may comprise the N-best Intents data—e.g., a list of N intents with the highest confidence scores among intents scored for a particular utterance). The natural language component 260 may send the cross-skill N-best list data 940 to a pruning component 950. The pruning component 950 may sort the NLU hypotheses represented in the cross-skill N-best list data 940 according to their respective scores. The pruning component 950 may then perform score thresholding with respect to the cross-skill N-best list data 940. For example, the pruning component 950 may select NLU hypotheses represented in the cross-skill N-best list data 940 associated with confidence scores satisfying (e.g., meeting and/or exceeding) a threshold confidence score. The pruning component 950 may also or alternatively perform number of NLU hypothesis thresholding. For example, the pruning component 950 may select a maximum threshold number of top scoring NLU hypotheses. The pruning component 950 may generate cross-skill N-best list data 960 including the selected NLU hypotheses. The purpose of the pruning component 950 is to create a reduced list of NLU hypotheses so that downstream, more resource intensive, processes may only operate on the NLU hypotheses that most likely represent the user's intent.

The natural language component 260 may also include a light slot filler component 952. The light slot filler component 952 can take text data from slots represented in the NLU hypotheses output by the pruning component 950 and alter it to make the text data more easily processed by downstream components. The light slot filler component 952 may perform low latency operations that do not involve heavy operations, such as those requiring reference to a knowledge base. The purpose of the light slot filler component 952 is to replace words with other words or values that may be more easily understood by downstream system components. For example, if an NLU hypothesis includes the word "tomorrow," the light slot filler component 952 may replace the word "tomorrow" with an actual date for purposes of downstream processing. Similarly, the light slot filler component 952 may replace the word "CD" with "album" or the words "compact disc." The replaced words are then included in the cross-skill N-best list data 960.

The natural language component 260 sends the cross-skill N-best list data 960 to an entity resolution component 970. The entity resolution component 970 can apply rules or other instructions to standardize labels or tokens from previous stages into an intent/slot representation. The precise transformation may depend on the skill. For example, for a travel skill, the entity resolution component 970 may transform text data corresponding to "Seattle airport" to the standard SEA three-letter code referring to the airport. The entity resolution component 970 can refer to a knowledge base that is used to specifically identify the precise entity referred to in each slot of each NLU hypothesis represented in the cross-skill N-best list data 960. Specific intent/slot combinations may also be tied to a particular source, which may then be used to resolve the text data. In the example "play songs by the stones," the entity resolution component 970 may reference a personal music catalog, Amazon Music account, user profile data, or the like. The entity resolution component 970 may output text data including an altered N-best list that is based on the cross-skill N-best list data 960, and that includes more detailed information (e.g., entity IDs) about the specific entities mentioned in the slots and/or more detailed slot data that can eventually be used by downstream components to perform an action responsive to the user input. The natural language component 260 may include multiple entity resolution components 970 and each entity resolution component 970 may be specific to one or more skills.

The entity resolution component 970 may not be successful in resolving every entity and filling every slot represented in the cross-skill N-best list data 960. This may result in the entity resolution component 970 outputting incomplete results.

The natural language component 260 may include a ranker component 990. The ranker component 990 may assign a particular confidence score to each NLU hypothesis input therein. The confidence score of an NLU hypothesis may represent a confidence of the system in the NLU processing performed with respect to the NLU hypothesis. The confidence score of a particular NLU hypothesis may be affected by whether the NLU hypothesis has unfilled slots. For example, if an NLU hypothesis associated with a first skill includes slots that are all filled/resolved, that NLU hypothesis may be assigned a higher confidence score than another NLU hypothesis including at least some slots that are unfilled/unresolved by the entity resolution component 970. The confidence score data may be sent to skill computing device(s) 125 and/or FIRM service computing device 127 (not shown in FIG. 9) and may be used to classify false invocations of a skill/skill action, as described herein.

The ranker component 990 may apply re-scoring, biasing, and/or other techniques to determine the top scoring NLU hypotheses. To do so, the ranker component 990 may consider not only the data output by the entity resolution component 970, but may also consider other data such as skill rating or popularity data. For example, if one skill has a particularly high rating, the ranker component 990 may increase the score of an NLU hypothesis associated with that skill, and vice versa. The other data may include information about skills that have been enabled for the user identifier and/or device identifier associated with the current user input. For example, the ranker component 990 may assign higher scores to NLU hypotheses associated with enabled skills than NLU hypotheses associated with non-enabled skills. The other data may include data indicating user usage history, such as if the user identifier associated with the current user input is regularly associated with user inputs that invoke a particular skill or does so at particular times of day. The other data may include data indicating date, time, location, weather, type of speech processing enabled device 110, user identifier, device identifier, context, as well as other information. For example, the ranker component 990 may consider when any particular skill is currently active (e.g., music being played, a game being played, etc.) with respect to the user or speech processing enabled device 110 associated with the current user input. The other data may include device type information. For example, if the speech processing enabled device 110 does not include a display, the ranker component 990 may decrease the score associated with an NLU hypothesis that would result in displayable content being presented to a user, and vice versa.

Following ranking by the ranker component 990, the natural language component 260 may output NLU results data 985 to the orchestrator 230. The NLU results data 985 may include a ranked list of the top scoring NLU hypotheses as determined by the ranker component 990. Alternatively, the NLU results data 985 may include the top scoring NLU hypothesis as determined by the ranker component 990.

The orchestrator 230 may send NLU results data 985 to arbitration component 298. Arbitration component 298 may determine a list of candidate skills for processing the utterance based on the NLU results data 885. Additionally, the arbitration component 298 may select a skill from among the candidate skills to process the utterance. As previously described, in at least some examples, the FIRM service 295 may be implemented in arbitration component 298. Accordingly, if an invocation is determined to be false for a particular skill, the arbitration component 298 may select a different candidate skill for processing the utterance based on the false invocation data output by the FIRM service 295.

In an example, after skill selection by arbitration component 298, the orchestrator 230 and/or arbitration component 298 may send all (or a portion of) the NLU results data 985 to a skill computing device(s) 125 executing a skill that is represented in the NLU results data 985 and to be invoked to perform an action responsive to the user input. As previously described herein, the various confidence scores generated by Natural language component 260, ASR component 250, recognizer(s) 863, arbitration component 298, etc., may be sent to the skill computing device(s) 125 as metadata associated with the utterance. Additionally, the ASR data generated by ASR component 250, the NLU data generated by Natural language component 260 (e.g., NLU results data) may be sent to the skill computing device(s) 125. In turn, the FIRM service 295 may be used to extract feature data from the metadata in order to predict whether an invocation of the skill (and/or of a particular action of the skill) is likely to be a false invocation. As previously described, the FIRM service 295 may be executed locally by the particular skill (e.g., on one or more skill computing device(s) 125), may be executed by separate FIRM service computing device(s) 127, by arbitration component 298, and/or may be executed by some combination thereof.

Figure 10:
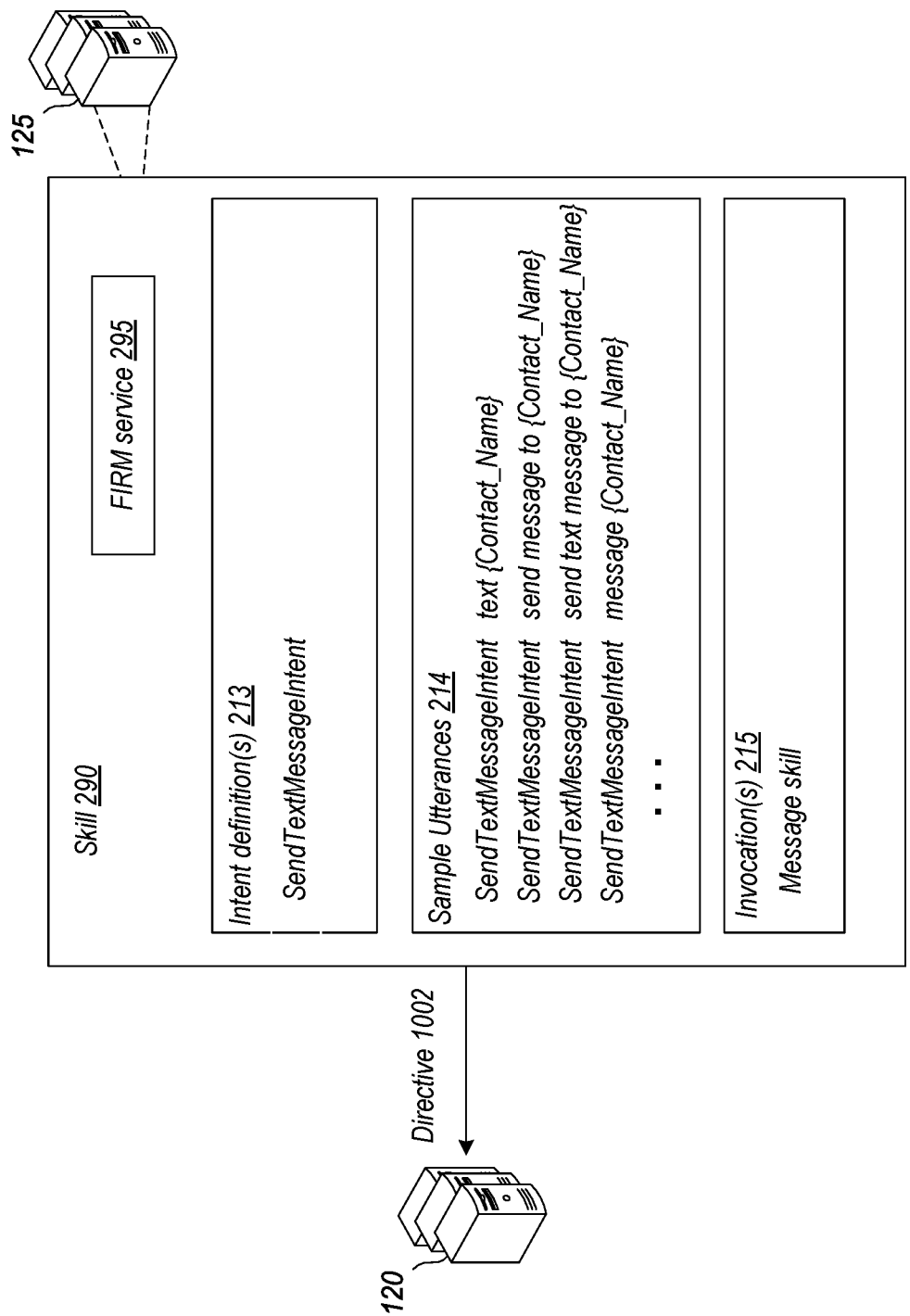
FIG. 10 is a block diagram illustrating an example architecture of a speech processing skill, in accordance with various embodiments of the present disclosure.

FIG. 10 is a block diagram illustrating an example architecture of a speech processing skill 290, in accordance with various embodiments of the present disclosure. In the example depicted in FIG. 10, skill 290 comprises FIRM service 295. However, as previously described, in some examples, FIRM service 295 may be implemented in one or more other components (e.g., in arbitration component 298).

Skill 290 may include intent definition(s) 213. Intent definition(s) 213 may represent the core functionality of the particular skill 290. In the example depicted in FIG. 10, skill 290 may be effective to send SMS messages to different user contacts (e.g., contacts associated with a user account and/or user profile). Accordingly, skill 290 may include the intent definition 213: SendTextMessageIntent. Skill 290, executing on skill computing device(s) 125, may include computer-executable instructions associated with SendTextMessageIntent effective to generate and send a text message (an SMS message) in response to a user request. Additionally, the instructions may generate text data confirming that the text message has been sent. The text data may be sent to speech processing computing device(s) 120 as directive 1002 for output by TTS component 280.

Skill 290 may include sample utterances 214. Sample utterances 214 may specify words and phrases that users may say to invoke the intents defined by intent definition(s) 213. For example, sample utterances 214 may include slot data effective to identify particular intents of the skill defined by intent definition(s) 213. Sample utterances 214 may include various utterances that may be associated with SendTextMessageIntent and/or other intent definitions 213 of skill 290. Invocation data 215 may include slot data effective to identify and invoke the skill. For example, invocation data 215 may include a name of the skill so that the user may invoke the skill by speaking the name and/or requesting that the skill name perform some action defined by intent definition(s) 213. In the example depicted in FIG. 10, the skill 290 may be named "Message skill." Accordingly, a user may invoke skill 290 by saying, "[wakeword], send message to {Contact Name} using Message skill," or similar. As a result of invoking the SendTextMessageIntent the skill 290 may be effective to take the appropriate skill action. In the current example, the appropriate skill action may be to send a text message to the specified user contact.

As previously described, FIRM service 295 may receive the various utterance data (e.g., intent data, slot data, NLU confidence data, ASR confidence data, etc.) and generate feature data representing the various utterance data. FIRM service 295 may determine a confidence score for the utterance after the relevant skill 290 has determined an action related to the utterance (e.g., after skill 290 has determined that a particular user contact is to be texted using the SendTextMessageIntent). As depicted in FIG. 10, the skill 290 may include the FIRM service 295 and may employ FIRM service 295 to determine whether or not the particular skill 290 and/or a particular action of the skill 290 has been falsely invoked. As previously described, in some other examples, arbitration component 298 may select the skill 290 for processing the utterance based at least in part on the output of the FIRM service 295.

The confidence score output by the FIRM service 295 may be used to determine whether or not the utterance represents a false invocation of the action of skill. If a confidence score and/or a confidence score bin indicated by FIRM service 295 indicates that the utterance represents a false invocation, the skill 290 may send an end session directive (e.g., directive 1002) to orchestrator 230 of speech processing computing device(s) 120 (FIG. 2) that may cause orchestrator to end the dialog session with speech processing enabled device 110. Conversely, if the confidence score bin indicated by FIRM service 295 indicates that the utterance is not a false invocation, the skill 290 may execute the action as normal. In at least some further examples, the confidence score bin indicated by FIRM service 295 may indicate that the user should be prompted to confirm the action prior to executing the action. Accordingly, skill 290 may send a directive 1002 comprising text data corresponding to the user confirmation prompt to orchestrator 230. The orchestrator 230 may send the text data to TTS component 280. TTS component 280 may transform the text data into corresponding audio data. The audio data may be sent by orchestrator 230 over network 104 to speech processing enabled device 110 for output as audio prompting the user to confirm the requested action. If the user confirms the requested action the skill 290 may execute the requested action. For example, in the example depicted in FIG. 10, a user may be prompted to confirm the sending of a text message to a user contact based on the confidence score output by FIRM service 295. For example, directive 1002 may include the text data, "Ok. Would you like me to send a text message to {Contact Name}?" In the example, the skill 290 may await an affirmative user response prior to executing the action (e.g., sending the relevant text).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of determining a false invocation of a speech processing skill, the method comprising:
   receiving, from a speech processing system, an automatic speech recognition (ASR) confidence score describing a first confidence level in text data representing an utterance;
   receiving, from the speech processing system, a natural language understanding (NLU) confidence score describing a first confidence level in intent data representing a semantic intent of the utterance;
   generating first feature data representing the ASR confidence score;
   generating second feature data representing the NLU confidence score;
   inputting the first feature data and the second feature data into an input layer of a machine learning model;
   determining, from an output layer of the machine learning model, a false invocation confidence score;
   determining that the false invocation confidence score is satisfies a confidence score threshold value; and
   sending a data directive to the speech processing system, wherein the directive is effective to cause the speech processing system to end a current dialog session.

2. The method of claim 1, further comprising:
   receiving, from the speech processing system, a second ASR confidence score describing a second confidence level in second text data representing a second utterance;
   receiving, from the speech processing system, a second NLU confidence score describing a second confidence level in second intent data representing a second semantic intent of the second utterance;
   generating third feature data representing the second ASR confidence score;
   generating fourth feature data representing the second NLU confidence score;
   inputting the third feature data and the fourth feature data into the input layer of the machine learning model;
   determining, from the output layer of the machine learning model, a second false invocation confidence score;
   determining that the second false invocation confidence score violates the confidence score threshold value; and
   sending text data representing a request for user confirmation to a text-to-speech component of the speech processing system.

3. The method of claim 1, further comprising:
   receiving, from the speech processing system, a second ASR confidence score describing a confidence level a first word of a second utterance;
   determining, using a maximum entropy intent classifier, an intent classification (IC) score for the first word, wherein the IC score represents an importance of the first word in classifying the second utterance to a first intent by an NLU component of the speech processing system;
   determining an IC-weighted ASR confidence value using the IC score and the second ASR confidence score;
   generating third feature data representing the IC-weighted ASR confidence score; and
   inputting the third feature data into the input layer of the machine learning model, wherein the false invocation confidence score is further determined based at least in part on the third feature data.

4. A method comprising:
receiving, from a speech processing system, speech processing confidence data comprising a confidence level in data generated by the speech processing system;
generating feature data representing the speech processing confidence data; and
determining, by a machine learning model based at least in part on the feature data, first false invocation data indicating a first likelihood of false invocation of a first speech processing skill.

5. The method of claim 4, further comprising:
sending a first directive to the speech processing system based at least in part on the first false invocation data, the first directive effective to cause the speech processing system to end a current dialog session.

6. The method of claim 4, further comprising:
receiving, from the speech processing system, utterance data comprising automatic speech recognition (ASR) data and natural language understanding (NLU) data;
receiving, from the speech processing system, ASR confidence data indicating a confidence level of the ASR data;
receiving, from the speech processing system, NLU confidence data indicating a confidence level of the NLU data;
determining, by the machine learning model based at least in part on the ASR confidence data and the NLU confidence data, second false invocation data indicating a second likelihood of false invocation of the first speech processing skill; and
sending text data representing a request for confirmation to the speech processing system based at least in part on the second false invocation data.

7. The method of claim 4, further comprising:
receiving, from the speech processing system, utterance data comprising automatic speech recognition (ASR) data and natural language understanding (NLU) data;
determining an action associated with the utterance data;
receiving, from the speech processing system, ASR confidence data indicating a confidence level of the ASR data;
receiving, from the speech processing system, NLU confidence data indicating a confidence level of the NLU data;
determining, by the machine learning model based at least in part on the ASR confidence data and the NLU confidence data, second false invocation data indicating a second likelihood of false invocation of the first speech processing skill, wherein the second likelihood is lower than the first likelihood; and
performing, by the first speech processing skill, the action associated with the utterance data.

8. The method of claim 4, further comprising:
determining an action associated with automatic speech recognition (ASR) data and natural language understanding (NLU) data generated by the speech processing system;
determining a threshold value, the threshold value associated with the action;
determining that a score associated with the first false invocation data satisfies the threshold value; and
sending a directive to the speech processing system based at least in part on the score satisfying the threshold value, the directive effective to cause the speech processing system to end a current dialogue session.

9. The method of claim 4, wherein the speech processing confidence data comprises automatic speech recognition (ASR) confidence data, the method further comprising:
generating ASR feature data representing the ASR confidence data;
sending the ASR feature data to an input layer of the machine learning model; and
determining the first false invocation data based at least in part on an output layer of the machine learning model.

10. The method of claim 4, further comprising:
receiving, from the speech processing system, utterance data;
receiving, from the speech processing system, an entity recognition confidence score;
receiving, from the speech processing system, entity recognition match data indicating a match type of the utterance data; and
determining the first false invocation data further based at least in part on the entity recognition confidence score and the entity recognition match data.

11. The method of claim 4, further comprising:
receiving, from the speech processing system, utterance data comprising automatic speech recognition (ASR) confidence data indicating a confidence level of a first word of the utterance data;
receiving, from the speech processing system, an intent classification (IC) score for the first word, wherein the IC score represents an importance of the first word in classifying the utterance data to a first intent by an natural language understanding (NLU) component of the speech processing system;
determining an IC-weighted ASR confidence value using the IC score and the ASR confidence data; and
determining the first false invocation data further based at least in part on the IC-weighted ASR confidence value.

12. The method of claim 4, further comprising:
receiving, from the speech processing system, first utterance data;
determining a first action associated with the first utterance data, wherein the first action is included in a first speech processing domain;
determining a first threshold value, the first threshold value associated with the first action;
comparing a score associated with the first false invocation data to the first threshold value;
sending a first directive to the speech processing system effective to cause the speech processing system to end a current dialog session based at least in part on the comparing the score to the first threshold value;
receiving, from the speech processing system, second utterance data;
determining a second action associated with the second utterance data, wherein the second action is included in a second speech processing domain;
determining a second threshold value, the second threshold value associated with the second action;
determining, by the machine learning model for the second utterance data, second false invocation data indicating a second likelihood of false invocation of a second speech processing skill; and
performing, by the second speech processing skill, the second action associated with the second utterance data based at least in part on a comparison of a score associated with the second false invocation data to the second threshold value.

13. The method of claim 4, further comprising:
receiving, from the speech processing system, automatic speech recognition (ASR) confidence data;
determining a threshold value associated with the ASR confidence data;
determining that a confidence level of the ASR confidence data is less than the threshold value; and
sending a first directive to the speech processing system based at least in part on the confidence level of the ASR confidence data being less than the threshold value, the first directive effective to cause the speech processing system to end a current dialog session.

14. A system comprising:
at least one processor; and
at least one non-transitory computer-readable memory storing instructions that, when executed by the at least one processor, are effective to program the at least one processor to:
receive, from a speech processing system, speech processing confidence data comprising a confidence level in data generated by the speech processing system;
generate feature data representing the speech processing confidence data; and
determine, by a machine learning model based at least in part on the feature data, first false invocation data indicating a first likelihood of false invocation of a first speech processing skill.

15. The system of claim 14, where the at least one non-transitory computer-readable memory stores further instructions that, when executed by the at least one processor, are further effective to program the at least one processor to:
send a first directive to the speech processing system based at least in part on the first false invocation data, the first directive effective to cause the speech processing system to end a current dialog session.

16. The system of claim 14, where the at least one non-transitory computer-readable memory stores further instructions that, when executed by the at least one processor, are further effective to program the at least one processor to:
receive, from the speech processing system, utterance data comprising automatic speech recognition (ASR) data and natural language understanding (NLU) data;
receive, from the speech processing system, ASR confidence data indicating a confidence level of the ASR data;
receive, from the speech processing system, NLU confidence data indicating a confidence level of the NLU data;
determine, by the machine learning model based at least in part on the ASR confidence data and the NLU confidence data, second false invocation data indicating a second likelihood of false invocation of the first speech processing skill; and
send text data representing a request for confirmation to the speech processing system based at least in part on the second false invocation data.

17. The system of claim 14, where the at least one non-transitory computer-readable memory stores further instructions that, when executed by the at least one processor, are further effective to program the at least one processor to:
receive, from the speech processing system, utterance data comprising automatic speech recognition (ASR) data and natural language understanding (NLU) data;
determine an action associated with the utterance data;
receive, from the speech processing system, ASR confidence data indicating a confidence level of the ASR data;
receive, from the speech processing system, NLU confidence data indicating a confidence level of the NLU data;
determine, by the machine learning model based at least in part on the ASR confidence data and the NLU confidence data, second false invocation data indicating a second likelihood of false invocation of the first speech processing skill, wherein the second likelihood is lower than the first likelihood; and
perform, by the first speech processing skill, the action associated with the utterance data.

18. The system of claim 14, where the at least one non-transitory computer-readable memory stores further instructions that, when executed by the at least one processor, are further effective to program the at least one processor to:
determine an action associated with automatic speech recognition (ASR) data and natural language understanding (NLU) data generated by the speech processing system;
determine a threshold value, the threshold value associated with the action;
determine that a score associated with the first false invocation data is greater than or equal to the threshold value; and
send a directive to the speech processing system based at least in part on the score satisfying the threshold value, the directive effective to cause the speech processing system to end a current dialog session.

19. The system of claim 14, where the at least one non-transitory computer-readable memory stores further instructions that, when executed by the at least one processor, are further effective to program the at least one processor to:
receive automatic speech recognition (ASR) confidence data;
generate ASR feature data representing the ASR confidence data;
send the ASR feature data to an input layer of the machine learning model; and
determine the first false invocation data based at least in part on an output layer of the machine learning model.

20. The system of claim 14, where the at least one non-transitory computer-readable memory stores further instructions that, when executed by the at least one processor, are further effective to program the at least one processor to:
receive, from the speech processing system, utterance data;
receive, from the speech processing system, an entity recognition confidence score;
receive, from the speech processing system, entity recognition match data indicating a match type of the utterance data; and
determine the first false invocation data further based at least in part on the entity recognition confidence score and the entity recognition match data.

* * * * *